(12) United States Patent
Bevan et al.

(10) Patent No.: US 6,891,897 B1
(45) Date of Patent: May 10, 2005

(54) SPACE-TIME CODING AND CHANNEL ESTIMATION SCHEME, ARRANGEMENT AND METHOD

(75) Inventors: Damian Bevan, Bishops Stortford (GB); Rudolf Tanner, Hertfordshire (GB); Alex Grant, North Adelaide (AU)

(73) Assignee: Nortel Networks Limited, St. Laurent (CA)

( * ) Notice: Subject to any disclaimer, the term of this patent is extended or adjusted under 35 U.S.C. 154(b) by 734 days.

(21) Appl. No.: 09/698,797

(22) Filed: Oct. 27, 2000

Related U.S. Application Data

(63) Continuation-in-part of application No. 09/360,872, filed on Jul. 23, 1999.

(51) Int. Cl.$^7$ ............................. H04L 5/12; H04L 1/02; H04B 1/66
(52) U.S. Cl. ..................... 375/265; 375/267; 375/240
(58) Field of Search .............................. 375/265, 240, 375/267, 347, 219–222, 367; 370/525, 337–340

(56) References Cited

U.S. PATENT DOCUMENTS

| | | | | |
|---|---|---|---|---|
| 5,056,112 A | * | 10/1991 | Wei | 375/280 |
| 5,301,209 A | * | 4/1994 | Wei | 375/265 |
| 5,838,267 A | * | 11/1998 | Wang et al. | 341/94 |
| 6,115,427 A | * | 9/2000 | Calderbank et al. | 375/267 |
| 6,128,330 A | * | 10/2000 | Schilling | 375/141 |
| 6,185,258 B1 | * | 2/2001 | Alamouti et al. | 375/260 |
| 6,208,669 B1 | * | 3/2001 | Cimini et al. | 370/525 |
| 6,353,911 B1 | * | 3/2002 | Brink | 714/780 |
| 6,424,642 B1 | * | 7/2002 | Schmidl et al. | 370/342 |
| 6,501,803 B1 | * | 12/2002 | Alamouti et al. | 375/265 |
| 6,614,861 B1 | * | 9/2003 | Terry et al. | 375/347 |

OTHER PUBLICATIONS

Multidimensional M–PSK trellis codes for fading channels, Leonardo, E.J.; Lin Zhang; Vucetic, B.S.; Information Theory, IEEE Transactions on , vol.: 42 Issue: 4 , Jul. 1996, pp.: 1093–1108.*

Rate 3/4 Convolutional Coding of 16–PSK: Code Design and Performance Study Wilson, S.; Sleeper, H., II; Schottler, P.; Lyons, M.; Communications, IEEE Transactions on [legacy, pre—1988] , vol.: 32 Issue: 12 , Dec. 1984, pp.: 1308–1315.*

(Continued)

*Primary Examiner*—Stephen Chin
*Assistant Examiner*—Cicely Ware
(74) *Attorney, Agent, or Firm*—Barnes & Thornburg LLP

(57) ABSTRACT

The evolution of high rate data services within future wireless networks will call for new RF access technologies to enable substantial increases in overall system spectral efficiency at an acceptably low cost to the user. Space-Time Coding (STC) is an antenna array processing technology currently simulating considerable Interest across the wireless industry. The invention provides a space-time coding apparatus having an input, a trellis encoder, a modulator, a demultiplexer, and a set of signal outputs wherein the input is operable to receive a stream of data. This allows de-multiplexing to take place after coding and modulation has been performed. The trellis encoder comprises a convolutional encoder operable to sequentially group data to provide coded bits to provide QPSK symbols. By the selection of convolutional encoder rates and/or modulation alphabets STCs of any desired dimensionality may be produced including multi-dimensional codes.

28 Claims, 18 Drawing Sheets

Space-Time Coding System Model

[Source Data Block]   L 'Space-Time Symbols'
(e.g. made up of QPSK, 8-PSK or 16-QAM constituent symbols)   [Decoded Data Block]

OTHER PUBLICATIONS

Trellis–coded multidimensional phase modulation Pietrobon, S.S.; Deng, R.H.; Lafanechere, A.; Ungerboeck, G.; Costello, D.J., Jr.; Information Theory, IEEE Transactions on , vol.: 36 Issue: 1 , Jan. 1990 pp.:63–89.*

Channel estimation and symbol detection for multiuser CDMA receivers using HMMs□□Perreau, S.; White, L.B.; Statistical Signal and Array Processing, 1998. Proceedings., Ninth IEEE SP Workshop on , Sep. 14–16, 1998; pp.:272–275.*

Perreau, "Channel Estimation and Symbol Detection for Space–Time Codes In Mobility Conditions", IEEE 2000 Proceedings.

* cited by examiner

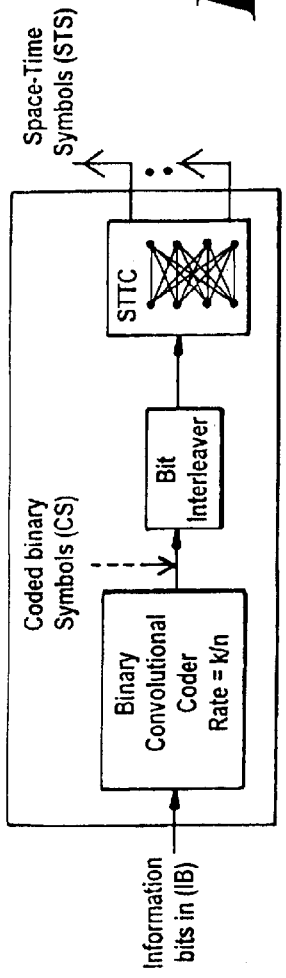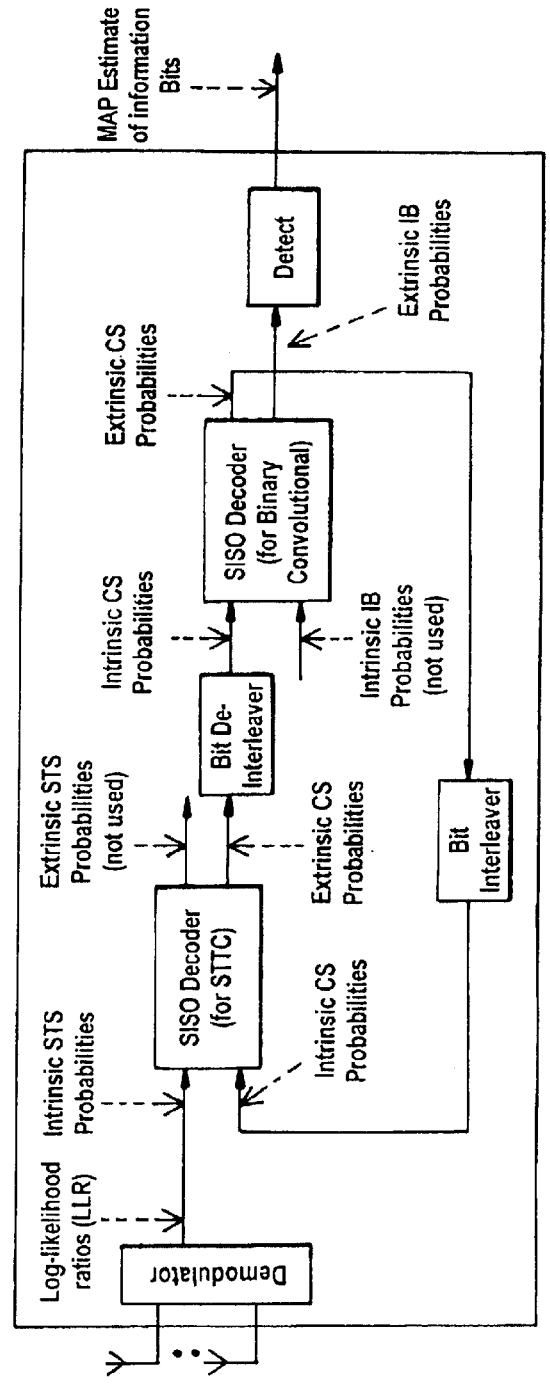
Fig. 9
SC-STTC Coder
SC-STTC Decoder

*Fig. 16*

| Constraint length K | Generators in octal | |
|---|---|---|
| 3 | 5 | 7 |
| 4 | 15 | 17 |
| 5 | 23 | 35 |
| 6 | 53 | 75 |
| 7 | 113 | 171 |
| 8 | 247 | 371 |
| 9 | 561 | 753 |
| 10 | 1,167 | 1,545 |
| 11 | 2,335 | 3,661 |
| 12 | 4,335 | 5,723 |
| 13 | 10,533 | 17,661 |
| 14 | 21,675 | 27,123 |

| STC-Algorithm (N_T:N_R) | $E_b/N_o$ dB for 10% FER | Spectral Efficiency (bps/Hz) | $E_s/N_o$ (SNR) dB for 10% FER |
|---|---|---|---|
| Benchmark | | | |
| 1:1 | 11.0 | 1.0 | 11.0 |
| 1:2 | 4.5 | 1.0 | 4.5 |
| 1:4 | -0.5 | 1.0 | -0.5 |
| STTD (STBC) | | | |
| 2:1 | 7.2 | 1.0 | 7.2 |
| 2:2 | 2.2 | 1.0 | 2.2 |
| STTC-32 | | | |
| 2:1 | 11.0 | 2.0 | 14.0 |
| 2:2 | 4.6 | 2.0 | 7.6 |
| MC-STTC-256 | | | |
| 2:1 | 9.6 | 2.0 | 12.6 |
| 2:2 | 3.5 | 2.0 | 6.5 |
| 4:1 | 12.0 | 4.0 | 18.0 |
| 4:2 | 4.0 | 4.0 | 10.0 |
| 4:4 | -1.5 | 4.0 | 4.5 |
| BLAST | | | |
| uncoded 2:2 | 12.0 | 4.0 | 18.0 |
| coded 2:2 | 7.1 | 2.0 | 10.1 |

*Fig.17*

Notes: Notation $N_T:N_R$ is used to denote numbers of antennas at each end of the link.
a) $E_s$ denotes energy per transmitted STS
b) The benchmark is a 1/2-rate k=9 binary convolutional encoder, with output bits mapped to QPSK symbols. In a *static* 1:1 channel it achieves 10% FER for an $E_b/N_o$ of 2.2dB and 1% BER for an $E_b/N_o$ of 1.7dB.
c) The benchmark 1:4 number is approximate, as it has been extrapolated from results at a lower FER
d) 'STTD' is a concatenation of the benchmark encoder with the STTD block code
e) 'STTC-32' is the Tarokh STTC with 32 states, and two information bits per STS
f) 'MC-STTC-256' is a concatenation of the benchmark scheme, a QPSK modulation mapper, and a demux mapper to the different transmit antennas. It thus has $2^{k-1}=256$ states in the trellis, and a spectral efficiency which depends on the number of transmit antennas.
g) The variants of BLAST shown in the table use 'genie-aided' subtraction of the transmission from the stronger transmit antenna when detecting the transmission from the weaker.
h) The 'uncoded' BLAST case uses no error correction code (it is raw QPSK), hence it achieves a high spectral efficiency of 4 bps/Hz. The 'coded' case uses two separate 'benchmark' encoders, one for each antenna.

| STC-Algorithm (N_T:N_R) | Spectral efficiency (bps/Hz) | Demodulator soft-metric (LLR) processing (MFLOPS) | Viterbi MLSE processing (MFLOPS) |
|---|---|---|---|
| Benchmark | | | |
| 1:1 | 1 | 0.9 | 198.4 |
| 1:2 | 1 | 2.5 | 198.4 |
| 1:4 | 1 | 5.0 | 198.4 |
| STTD (STBC) | | | |
| 2:1 | 1 | 2.5 | 198.4 |
| 2:2 | 1 | 5.0 | 198.4 |
| STTC-32 | | | |
| 2:1 | 2 | 8.7 | 12.4 |
| 2:2 | 2 | 17.4 | 12.4 |
| MC-STTC-256 | | | |
| 2:1 | 2 | 8.7 | 99.2 |
| 2:2 | 2 | 17.4 | 99.2 |
| 4:1 | 4 | 69.4 | 168.6 |
| 4:2 | 4 | 138.9 | 168.6 |
| 4:4 | 4 | 277.8 | 168.6 |
| 8:8 | 8 | 71,198 | 1276.4 |
| BLAST (coded) | | | |
| 2:2 | 2 | 0.02+2.5+1.2=3.7 | 198.4 |
| 4:4 | 4 | 0.7+5.0+3.7=9.4 | 198.4 |
| 8:8 | 8 | 24.8+9.9+8.7=43.4 | 198.4 |

*Fig. 18*

SPACE-TIME CODING AND CHANNEL ESTIMATION SCHEME, ARRANGEMENT AND METHOD

CROSS-REFERENCE TO RELATED APPLICATION

This application is a continuation-in-part of co-pending application Ser. No. 09/360,872 filed on Jul. 23 1999.

FIELD OF THE INVENTION

The present invention relates to space-time coding schemes and to channel estimation for space-time encoded transmissions. The invention relates particularly, though not exclusively to space-time coding schemes for radio communications.

BACKGROUND TO THE INVENTION

The evolution of high rate data services within future wireless networks will call or new RF access technologies to enable substantial increases in overall system spectral efficiency at an acceptably low cost to the user. This assumption is based on the widely promoted view that data capacity requirements will grow exponentially over the next few years with RF spectrum remaining a scarce commodity.

Space-Time Coding (STC) is an antenna array processing technology currently stimulating considerable interest across the wireless industry. It promises to deliver substantial system benefits in terms of the achievable air interface spectral efficiency, and is considered for future high capacity, wireless data products.

STC exploits both the temporal and spatial dimensions for the construction of coding designs which effectively mitigate fading (for improved power efficiency) and are able to capitalize upon parallel transmission paths within the propagation channel (for improved bandwidth efficiency). The use of multiple propagation paths is fundamental to the concept, and provides the means for better Signal to Noise Ratio (SNR) gain (i.e. power efficiency) and better diversity performance across the radio link. Furthermore, in a rich multipath environment antenna processing can provide access to independent, parallel transmission paths, which are also referred to as 'spatial modes', 'spatial channels' or 'data pipes'.

In FIG. 3 there is shown a plot for the throughput (as defined by Foschini and Gans "On Limits of Wireless Communications in a Fading Environment when using Multiple Antennas"', Wireless Personal Communications, Vol. 6, 1998, Kluwer Academic Publishers, pp. 311–335) which is exceeded for 90% of frames (known as the '10% Outage Capacity') from a number of transmit elements ($N_T$) and a number of receive elements ($N_R$) for the cases of ($N_T$, $N_R$)=(1,1), (2, 2), (4,4) and (1,4) over 10,000 random channel realizations for different overall mean SNRs. In order to calculate fundamental per-link capacity bounds, coded data frames of length approaching infinity are assumed, with random, independent, Rayleigh channel realizations for each transmitter-receiver path. Thus an ($N_R$,$N_T$) matrix of complex channel gains, H, can be constructed with independent complex Gaussian elements. A transmitter would have no prior knowledge of the instantaneous channel realizations, and so would send equal-power uncorrelated noise-like waveforms to the different antennas. It can be shown that the fundamental capacity (i.e. maximum throughput for vanishingly small error probability) for such a system would vary from frame-to-frame, as a function of the eigenvalues of the matrix product $HH^H$.

There are large 'outage capacity' increases for $N_T=N_R=N=1,2$ and 4. This is due to the combined effects of transmitter/receiver diversity (which draws the 'worst cases' closer to the median cases), receiver SNR power gain, and parallelism. These increases can be considered as a capacity increase at a given receiver SNR, or conversely a reduction in required SNR for a given link capacity. Note that the case of ($N_T$,$N_R$)=(1,4) is much better than (1,1) due to the extra SNR gain and diversity, even though there is no parallelism to be exploited with (1,4). However, there are still additional benefits in going to (4,4) In terms of diversity and parallelism (offering an additional multiplicative factor).

It is commonly accepted that the capacity of CDMA cellular systems is inversely proportional to the working $E_b/N_o$ of the subscribers. In the reverse-link case, it is the received $E_b$ which must be minimized, whereas for the forward-link our aim is to minimize the transmitted $E_b$ (where $E_b$ denotes energy per information bit). Thus the per-link throughput increases as a logarithmic function of link $E_b$ (in the manner prescribed by Shannon, 'Communication in the Presence of Noise' Proc. IRE, vol. 37, pp. 10–21, Jan. 1949), whereas the number of links which can be supported is inversely proportional to $E_b$. If we consider the overall network capacity to be the product of the per-link capacity and number of links, then we obtain the characteristic shown in FIG. 4. This shows that systems with larger numbers of links, each working at a lower $E_b/N_o$ and hence lower throughput, will have a larger network capacity (i.e. higher spectral efficiency) than systems working at a higher link $E_b/N_o$, but with fewer links. This is independent of any statistical multiplexing benefits which apply for large numbers of users, and this further favors systems with large numbers of low-SNR/low-throughput links. This analysis relies upon the assumption that the system is not bandwidth limited (i.e. in the case of the CDMA forward link this requires that there be a plentiful supply of Walsh codes).

It can therefore be deduced that, for a CDMA network which is severely interference-limited, every 3dB reduction in $E_b/N_o$ at the same link throughput and error rate provides a 2-fold capacity benefit. For other system scenarios, for example fixed directional-antenna systems such as Nortel Networks' Fixed wireless Access product 'Proximity II', or other mobile/nomadic or fixed-wireless applications where there are multiple diversity antennas at the terminal, the arguments are reversed. The interference level is low, but the number of frequency channels/timeslots (TDMA) or orthogonal Walsh codes (CDMA) is limited. System capacity should be enhanced by using more bandwidth-efficient modulation, that is, modulation with a higher spectral efficiency in terms of bps/Hz. In the case of bandwidth-limited systems, every 2-fold increase in coder/modulation spectral efficiency at the same error rate provides a 2-fold capacity benefit. In terms of the capacity vs. SNR curves of FIG. 3, there is a goal to increase the bps/Hz axis.

Two major applications are currently envisaged for STC technology; (i) Low mobility or nomadic high rate wireless terminals (i.e. laptop or Personal Digital Assistant (PDA) versions) which could be expected to operate both outdoors and indoors; (ii) Fixed terminals deploying indoor or outdoor antennas. The propagation channel will differ significantly according to the application scenario in terms of the multipath angle spread and time dispersion. The angle spread phenomenon, In particular, will have significant impact on the link performance gain using Space-Time Coding. The terminal antenna design and its interaction with the surrounding propagation environment also influence the attainable performance gain of the STC configuration. It is envisaged that STC technology will be applied to a range of possible systems including EDGE, $3^{rd}$ Generation WCDMA, future fixed wireless access, and 4th Generation systems.

Several key implementation issues influence the achievable performance gain using STC. Since STC capitalizes on the inherent parallelism in the spatial channel, one possible risk concerns the substantial increase in DSP load needed to estimate the multiplicity of channel impulse responses at the terminal.

The fundamental principle of STC, is illustrated in FIG. 1. Coded data symbols are transmitted simultaneously from multiple antennas. This simultaneous transmission of modulation symbols from different antennas is termed a Space-Time Symbol (STS). Since modulation symbols can conventionally be represented by a complex number, an STS can be represented by a vector of complex numbers, with the number of complex elements in the vector equal to the number of transmit antennas. In a Frequency Division Multiple Access/Time Division Multiple Access (FDMA/TDMA) system these simultaneous symbols use the same carrier frequency and same symboling waveform. In a CDMA system—an identical symboling waveform, in the form of an identical spreading code (i.e. Walsh code) is also used.

Assuming a non-dispersive channel, the receiver simultaneously detects all of the elements of a transmitted STS using a single symbol-matched filter per receiver antenna. These detection outputs are built up into a (vector) detection statistic. Thus FIG. 1 shows that every element of this vectorial receiver detection statistic is a superposition of the multiple simultaneous transmissions, as seen at each receiver antenna. This cross-coupling between antenna transmissions can be thought of as a form of intersymbol interference (ISI). Each element, viewed over many STS, will thus resemble a somewhat disorganized Quadrature Amplitude Modulated (QAM) type constellation (in the noice-free case), where the exact form of this constellation depends on the STC encoder structure, STC modulation alphabet and instantaneous channel.

In the case of multiple receive antennas the transmissions from individual transmit antennas, however, may not be totally (spatially) separated at the receiver. This spatial-ISI can be overcome in a number of ways, including; by a form of antenna spatial 'nulling' (analogous to linear 'zero-forcing' time-domain equalization) or spatial Minimum Mean-Squared Error (MMSE) beamforming (analogous to linear MMSE time-domain equalization); or, subtraction (analogous to Decision Feedback time-comain equalization); or, maximum-likelihood sequence estimation (MLSE) of coded Space-Time Symbols (and hence information biyts) from all transmit antennas, based on observations of the vectorial receiver decision statistic over the whole coded frame.

Using conventional methods (and with a bounded receiver complexity), waveform design is inevitably a compromise between bandwidth efficiency and power efficiency. However, apparently good STC systems can seemingly 'side-step' the above barrier (Shannon bound) by achieving increased bandwidth efficiency with little or no reduction in power efficiency. In principle, STC transmissions could be successfully received in a link with only a single receiver antenna. However, the power efficiency would be very poor, because it would not be possible to capitalize on the additional SNR and diversity gain provided by a multiple-antenna terminal design, and due to the lack of multiple parallel decoupled 'data pipes'. Put more simply, and referring again to FIG. 1 (assuming only a single receiver antenna), the receiver detection statistic would only have a single element, and it would resemble an extremely high-order QAM constellation (but which changes both in size and shape as the channel fades at the Doppler rate). This high-order constellation would have a large number of constellation points, all lying in the same 1-dimensional complex space. Hence, like QAM, the power efficiency of such a link would be rather poor. In the limit, two constellation points may even lie on top of one another, and the receiver would require redundancy (memory) in the coding in order to separate them.

There are, of course, other proposed increased capacity transmission and reception techniques besides STC, some of which are alternatives to STC, while others may be complementary. One possible technique is 'fixed beamforming' (FB), which in the case of the BTS implies a higher order of sectorisation. FB can actually be complementary to STC, although if both techniques were to be used simultaneously, the number of antenna elements required would increase multiplicatively.

FIG. 2 illustrates a possible range of applications for Space-Time Coding technology: Low mobility applications, which include pedestrian and nomadic terminals —where terminals would be in the form of PDAs or some other form of personal communicators and laptops, which would be expected to operate in both outdoor and indoor environments; in-building, wireless LAN, where the propagation channels often have a quite limited delay spread but would typically exhibit very rich multipath (angle) scatter; Wideband fixed wireless access (e.g. Multi-channel Multi-point Distribution Service [MMDS]) involves Space-Time Coding and adaptive antenna processing at the subscriber and could be exploited to provide enhanced link SNIR margin to increase system capacity and enable simpler installations using indoor (non-directional) antennas; and in-vehicle, high mobility applications.

In many cases, however, the capacity limits of both interference and bandwidth (Walsh code) have been reached, thus leaving no conventional means of increasing capacity.

It will be noted from the above, that the signal seen at each receive antenna is a superposition of the multiple simultaneous transmissions from each transmit antenna. With reference to the channel model of FIG. 11, (and as described in V. Tarokh, N. Seshadri and A. Calderbank, "Space-time codes for high data rate wireless communication: Performance criterion and Code Construction," IEEE Trans. Inform. Theory 44(2):744–764, March 1998) at each symbol interval i the transmitted vector $x=(x_1,x_2,\ldots,x_t)$ is received according to $y[i]=H[i]x[i]+n[i]$. Where $y[i]$ is a sequence of received r-vectors, $x[i]$ is a sequence of transmitted t-vectors, $n[i]$ is a sequence of noise vectors and H is an r x t matrix representing the channel coefficients.

Accurate channel estimation (i.e. estimation of the complex gains between each transmit/receive antenna pair) is important for reliable decoding of space-time codes. This is because the maximum likelihood branch metric $M(x,y)$ for a received vector y and hypothesized transmit symbol x is given by $$M(x,y)=\|y=Hx\|^2_2$$

Thus in a space-time decoder it is necessary to calculate the Euclidean distance between the received vector and what would have been received if x was transmitted. it is only possible to find out what would have been received if the channel gains are known.

The maximum likelihood sequence estimator (implemented by the Viterbi algorithm) outputs the sequence that minimizes the sum of such branch metrics over the window of interest. The channel parameters are required in calculation of these maximum likelihood metrics. If these parameters are not known exactly, the discrepancy between the parameters used and the actual channel parameters has an effect similar to having an increased amount of thermal noise, which degrades performance. This is in contrast to a single antenna additive noise channel, in which knowledge of the signal amplitude or noise variance is not required for the Viterbi algorithm (although it is required for the maximum- a posteriori [MAP] algorithm).

Using the analysis given In V. Tarokh, K Naguib, N. Seshadri and A. Calderbank ("Space-time codes for high data rate wireless communication: Performance criteria in the presence of channel estimation errors, mobility and multiple paths," IEEE Trans. Commun. 47(2);199–207 Feb. 1999), it can be shown that if the channel uncertainty is modelled as an additive noise term with variance v on each of the channel gains, a loss in coding gain of approximately $$10 log_{10}(vt\gamma) dB \qquad (1)$$

is suffered, where t is the number of transmit antennas and $\gamma=E_s/N_0$ is the signal to noise ratio (SNR). This is especially bad since the channel estimation noise variance is amplified by both the number of transmit antennas, and the operating SNR Since the channel gains H are not known a-priori, they must be estimated. The conventional method is to transmit a known sequence of data called a training sequence, which is used by the receiver to produce estimates of the channel gains. Since the performance of the decoding step depends on the accuracy of these channel estimates, a minimum mean square error estimator (MMSE) may be used. This would minimize the variance of the error on the channel estimates, which in turn minimizes the implementation loss described in Equation 1.

The typical behavior of MMSE estimators is that their error variance decreases with the inverse of the length of the training sequence. In other words, approximately twice as many training symbols are needed in order to halve the mean squared error in the channel estimates. Thus the length of the training sequences has an impact on achievable system performance.

The use of long training sequences, however, goes against the main goal of space-time coding, which as discussed above, is to provide high-rate, spectrally efficient communication. Such training sequences use up power and bandwidth which could instead have been used to transmit data.

In the cdma2000 system, for example, pilot sequences transmitted on orthogonal carriers may be used for the purposes of downlink channel estimation. While the use of pilot sequences appears not to affect the spectral efficiency (since the amount of data transmitted in a packet is unchanged), closer examination indicates that this is not the case. An additional pilot per transmit antenna is required which increases the total transmit power at the base-station. Also, additional Walsh codes must be dedicated to these pilots. Furthermore, the pilot channels produce Interference for users in other cells.

It is therefore desirable to reduce the amount of training symbols and/or the total pilot power required, without affecting the performance of the decoder. This in turn will provide increased capacity.

OBJECT OF THE INVENTION

The present invention seeks to provide an improved space-time coding scheme and an improved channel estimation scheme. The present invention further seeks to provide a space-time coding scheme having an increased spectral efficiency. A still further object of the invention is to provide space-time coding scheme having an increased improved bandwidth and power efficiency.

SUMMARY OF THE INVENTION

In accordance with a first aspect of the invention there is provided Space-time coding apparatus comprising a data input, a plurality of signal outputs couplable to a respective plurality of transmit antennas, a trellis encoder implemented using a convolutional encoder and arranged to receive data from the data input and to produce encoded data in the form of code symbols, a modulator arranged to map the encoded data to predetermined modulation symbols (e.g. QPSK) and a de-multiplexer arranged to de-multiplex the modulation symbols to the signal outputs.

Preferably the input receives binary data and the convolutional encoder groups sequentially input data into four-bit groups, which are processed by the encoder to provide eight-bit data groups which are subsequently converted to QPSK symbols.

Preferably the trellis encoder comprises a convolutional encoder having a shift register with two parts operable to generate two code signals for each data bit input to the trellis encoder, wherein the code signals are encoded by a generator function, wherein the two coded signals are switched to an output of the encoder.

Preferably the set of signal outputs comprise channellisers, radio frequency mixers, and amplifiers, and may also comprise radio frequency transmit antennas.

The space-time coding apparatus may be arranged to provide multdimensional space-time codes, wherein multiple space-time symbols are output for every trellis transition.

In accordance with a second aspect of the present invention there is provided a method of space-time encoding comprising receiving a stream of data at an input, trellis encoding the data stream using a convolutional encoder operable to sequentially group data to provide coded bits, outputting the encoded data to a modulator, operating the modulator to map the encoded signals to QPSK symbols to provide modulated signals, and operating a de-multiplexer to switch the modulated signals to a set of signal outputs.

Preferably the input receives binary data and the convolutional encoder groups sequentially input data into four bit groups, which are processed by the encoder to provide eight-bit data groups which are subsequently converted to QPSK symbols.

Preferably the trellis encoder comprises a convolutional encoder having a shift register with two parts operable to generate two code signals for each data bit input to the trellis encoder, wherein the code signals are encoded by a generator function, wherein the two coded signals are switched to an output of the encoder.

In accordance with a third aspect, the invention provides a method of space-time encoding a data stream comprising the steps of trellis encoding a data stream using an optimal binary convolutional code of predetermined constraint length, modulating the encoded data by mapping the encoded data stream to modulation symbols selected from a predetermined modulation alphabet, and de-multiplexing the modulation symbols to a plurality of transmit antennas.

In accordance with a fourth aspect, the invention provides a method of estimating complex channel gain in a space-time communications system comprising the steps of estimating an initial, relatively coarse estimate of channel gain, receiving space-time encoded information symbols over the channels, decoding the information symbols using the initial channel estimate, to produce a sequence of coded symbol probabilities, calculating a sequence of coded symbol averages based on the coded symbol probabilities, refining the channel estimate for each channel by processing the received symbols to remove the expected effect of the transmissions carried by all the other channels by performing soft cancellation using the relevant parts of the sequence of symbol averages, and to remove the expected effect of modulation on each symbol, and by averaging the channel estimates over all symbols for each respective channel to produce a refined estimate for each channel, decoding the information symbols again using the refined channel estimate, to produce a refined sequence of coded symbol probabilities, repeating the calculating, refining and decoding steps until convergence, and decoding the information symbols using the final channel estimate and using hard decisions.

The invention also provides in another aspect, a computer program which, when executing on suitably configured hardware, causes the hardware to perform the steps of the above method.

In a further aspect, the invention provides channel estimation apparatus for a space-time communications system comprising an initial estimator operable to generate an initial, relatively coarse estimate of channel gain, a receiver operable to receive space-time encoded information symbols, a decoder operable to produce a sequence of coded symbol probilities by decoding received information symbols using a channel estimate and to decode the information symbols using a final channel estimate using hard decisions, averaging means operable to calculate a sequence of coded symbol averages based on the coded symbol probabilities, and estimate refining means operable to refine the channel estimate for each channel, by processing the received symbols to remove the expected effect of the transmissions carried by all the other channels by performing soft cancellation using the relevant parts of the sequence of symbol averages, and to remove the expected effect of modulation on each symbol, and by averaging the channel estimates over all symbols for each respective channel to produce a refined estimate for each channel.

In accordance with a further aspect of the present invention there is provided a communications system wherein space-time coding is employed by the system including transmitting apparatus and receiver apparatus Wherein the transmitter apparatus comprises an input, a trellis encoder, a de-multiplexer, and a set of signal outputs wherein the input is operable to receive a stream of data; the trellis encoder is operable to encode the data and which is operable to output encoded data to the de-multiplexer, which de-multiplexer switches signals to the set of signal outs; and wherein the trellis encoder comprises a convolutional encoder operable to sequentially group data to provide coded data, which encoded data is mapped to provide modulated symbols.

In another aspect, the invention provides, a communications system arranged to use space-time coding, and comprising transmitter apparatus and receiver apparatus, wherein the receiver apparatus includes an initial estimator operable to generate an initial, relatively coarse estimate of channel gain, a receiver operable to receive space-time encoded information symbols, a decoder operable to produce a sequence of coded symbol estimates using a channel estimate, and estimate refining means operable to refine the channel estimate for each channel, by processing the received symbols to remove the expected effect of the transmissions carried by all the other channels by performing cancellation using the relevant parts of the sequence of symbol estimates, and to remove the expected effect of modulation on each symbol, and by averaging the channel estimates over all symbols for each respective channel to produce a refined estimate for each channel, the apparatus being arranged to iteratively repeat the refining of the channel estimation and the production of symbol estimate functions until convergence of the channel estimates occurs.

In accordance with a still further aspect of the present invention there is provided a computer processing chip operable to encode at least a stream of data and which is operable to output encoded data wherein the chip comprises a convolutional encoder operable to sequentially group data to provide coded bits to provide modulated symbols.

In accordance with a still further aspect of the present invention there is provided software preferably stored on a machine readable medium, which is operable to cause suitable hardware to encode at least a stream of data and which is operable to output encoded data wherein the software is programmed to function as a convolutional encoder operable to sequentially group data to provide coded bits, which coded bits are mapped to provide modulated symbols.

A Modified Convolutional Space-Time Trellis Coder (MC-STTC) has thus been developed which compares well against other known Space-Time Coding algorithms. This new design (described in detail below) provides an impressive coding gain and demonstrates that substantial performance gains are possible compared to radio links based on conventional antenna configurations (i.e. those that do not exploit Space-Time Coding).

Simulations indicate that a 256-state MC-STTC algorithm using four antennas at both the transmitter and receiver can provide a 12.5 dB improvement in power efficiency over a single transmit antenna, single receive antenna, coded baseline configuration under quasi-static, flat (uncorrelated) fading. At the same time the MC-STTC arrangement provides a four-fold improvement in spectral efficiency by virtue of the parallel transmission. The MC-STTC arrangement also provides an 8.7 dB power efficiency gain over a transmit diversity baseline implementing an STTD block code concatenated with a k=9 binary convolutional encoder, when operating under the same flat fading conditions.

An analysis of the DSP complexity of these new STC schemes has shown that the 256-state MC-STTC algorithm can produce approximately 2.2 times the processing power of the two benchmark configurations in relation to the demodulator soft metric processing and Viterbi maximum likelihood sequence estimate (MLSE) processing. p In the cases where the limits of interference and bandwidth are approached, the required SNR of the transmission scheme employed should be reduced and the spectral efficiency should be increased. Through a combination of terminal antenna diversity, coupled With Space-Time Coding (assuming suitable code design and appropriate channel behaviour), the above system design objectives can be met.

BRIEF DESCRIPTION OF THE DRAWINGS

In order that the present invention is more fully understood and to show how the same may be carried into effect, reference shall now be made, by way of example only, to the figures as shown in the accompanying drawing sheets, in which:

FIG. 9 shows a proposed SC-STTC coder/decoder structure;

FIG. 16 shows possible code designs for MC-STCC-N for different N, where $N=2^{k-1}$;

FIG. 17 shows simulated performance of STC algorithms; and

FIG. 18 shows STC algorithm complexity (at a data rate of 153.6 kbps).

DETAILED DESCRIPTION OF PREFERRED EMBODIMENTS

Figure 1:
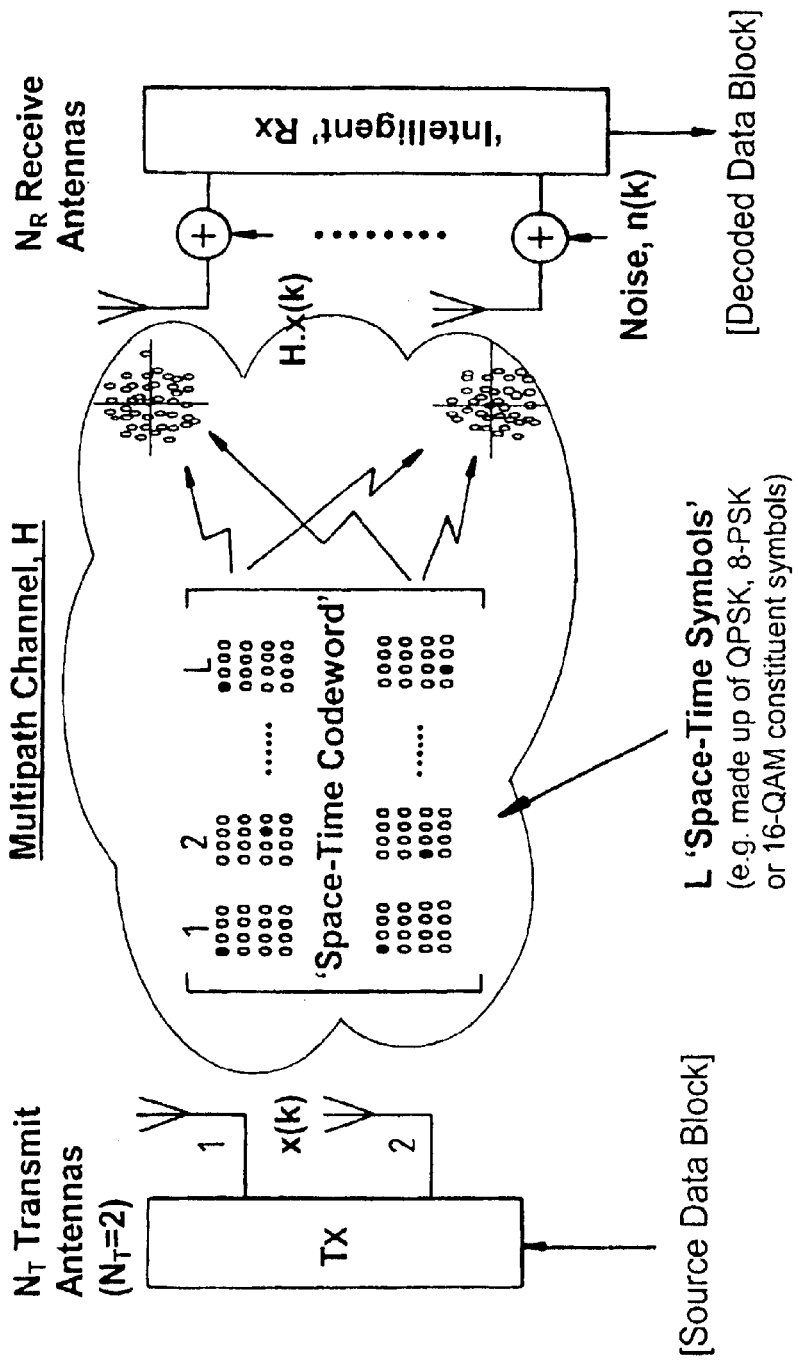
FIG. 1 shows a system model of space-time coding.
Figure 2:
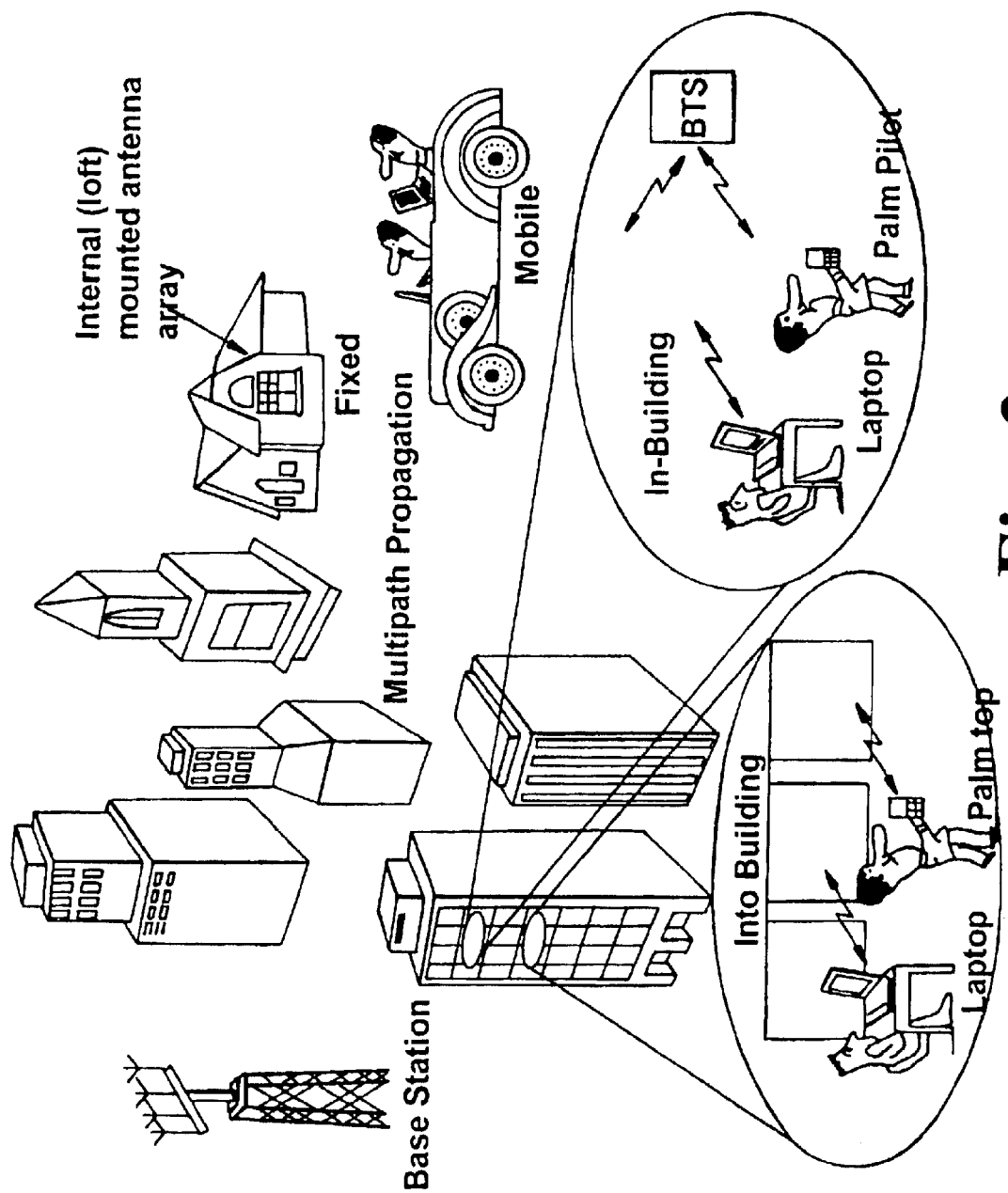
FIG. 2 shows STC target applications.
Figure 3:
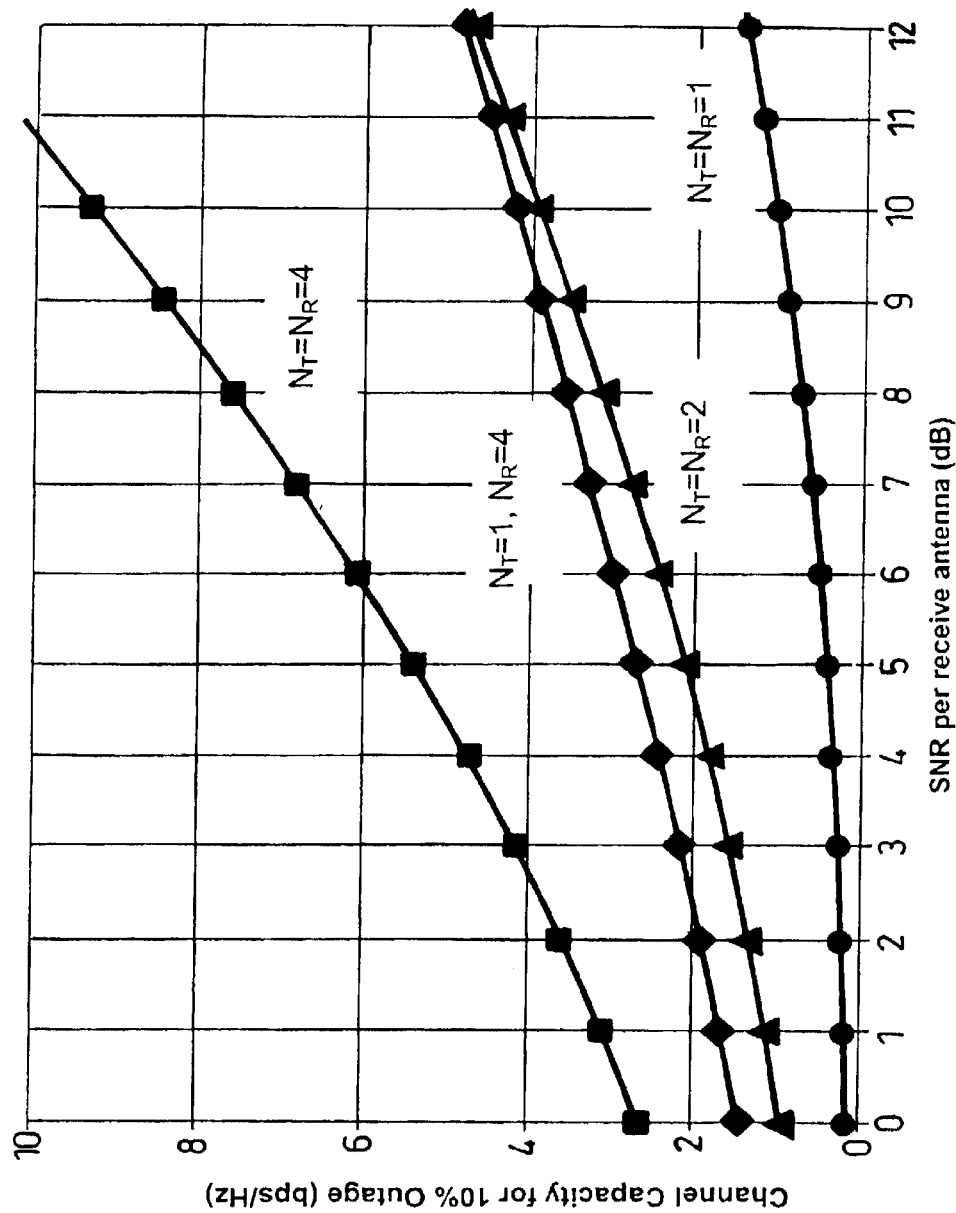
FIG. 3 shows a 10% outage capacity (bps/Hz) with correlated fading.
Figure 4:
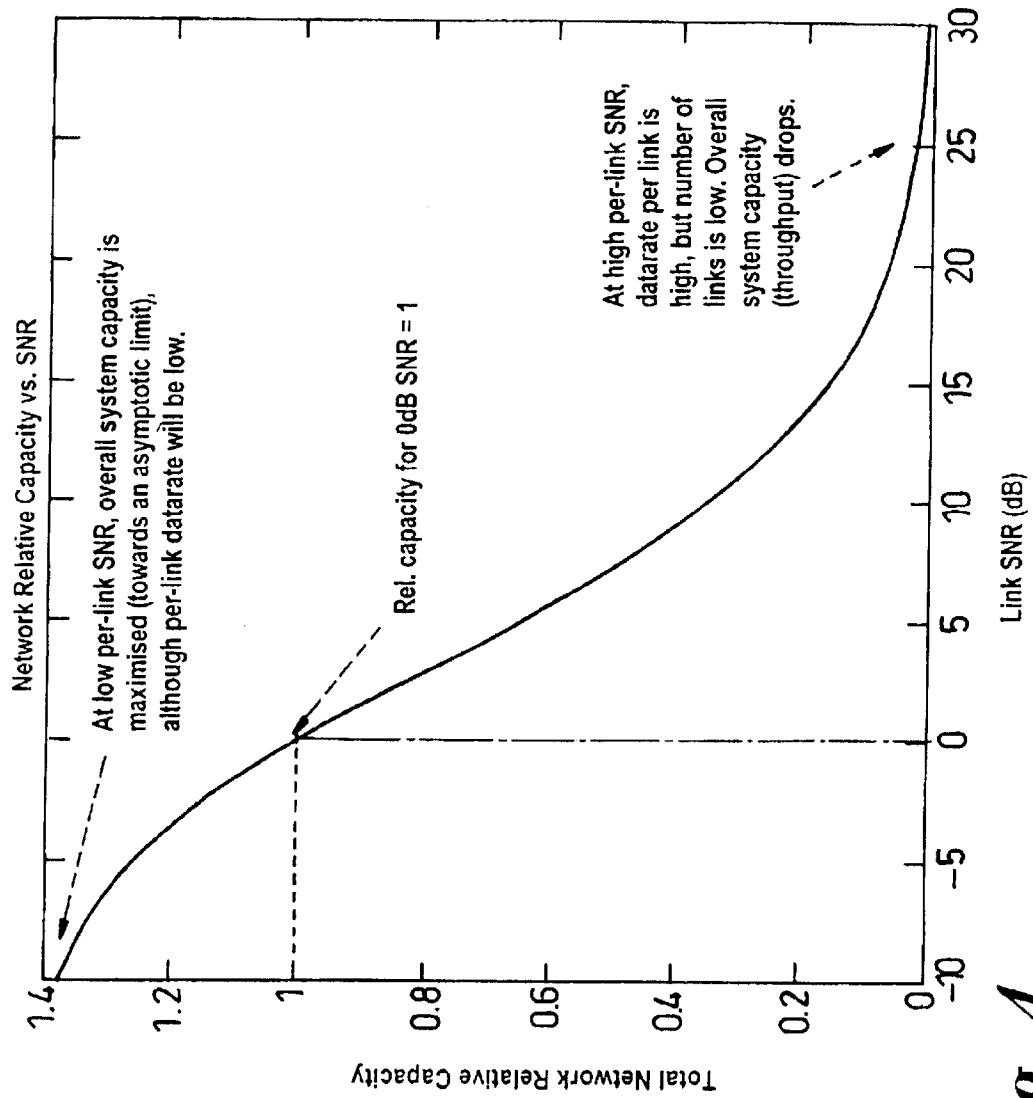
FIG. 4 shows relative capacity vs. per-link SNR for a CDMA network.

There will now be described by way of example the best mode contemplated by the inventors for carrying out the invention. In the following description, numerous specific details are set out in order to provide a complete understanding of the present Invention. It will be apparent, however, to those skilled in the art that the present Invention may be put into practice with variations of the specific.

In 3G CDMA air interfaces such as the cdma2000 air interface, Space-Time Coding is a candidate coding technique. The first stage of applying STC is to have the required number of antennas and receiver chains at the terminal. In the case of a terminal having 4 receiver chains then there should be an average benefit of 6dB SNR gain (under ideal conditions), plus some additional diversity gain provided that interference is uncorrelated. If the 4 receiver channels have equal mean power, then the 6dB SNR gain will be achieved regardless of the degree of correlation between the fading seen at these different antennas. The diversity gain achieved will be dependent upon the signal fading correlation.

EDGE is a recently-introduced enhancement to GSM, potentially using a more complex trellis coding and higher-order modulation format within the familiar GSM burst structure. Although it is believed not to have been proposed previously, a possible future enhancement to EDGE could be to replace the currently-proposed Trellis-Coded Modulation (TCM) technique with an appropriate STC technique. Unlike most proposed 3G mobile CDMA systems, EDGE maintains orthogonality between users on the reverse link (since no two users in a given sector will share the same timeslot and carrier frequency). Thus the potentially high spectral-efficiency of STC techniques makes them attractive on the EDGE reverse link (uplink) as well as the forward link (downlink), whereas for CDMA systems it is predominantly the latter which is of interest, since the reverse link traditionally uses random spreading codes. For the case of a flat-fading (non-dispersive) channel, the performance and complexity of an STC scheme applied to EDGE can be readily analysed. In the event of a dispersive channel, however, then the performance becomes more difficult to analyse and the best approach in this dispersive case would be to treat the effect of the dispersive channel as a form of trellis coding and therefore to treat the concatenation of the Space-Time Coder and channel as a serially-concatenated code. Serially-concatenated codes are described in more detail below.

The DSP processing complexity of the STC demodulation and decoding processing for a number of candidate Space-Time Codes is discussed below. The discussion is generic to various different multiple access system configurations (e.g. CDMA/TDMA). However, there are other areas of transmitter and receiver analogue and digital signal processing where STC may imply additional complexity. This arises directly from the fact that the use of STC implies greater numbers of transmitters and receivers at each end of the link.

Figure 5:
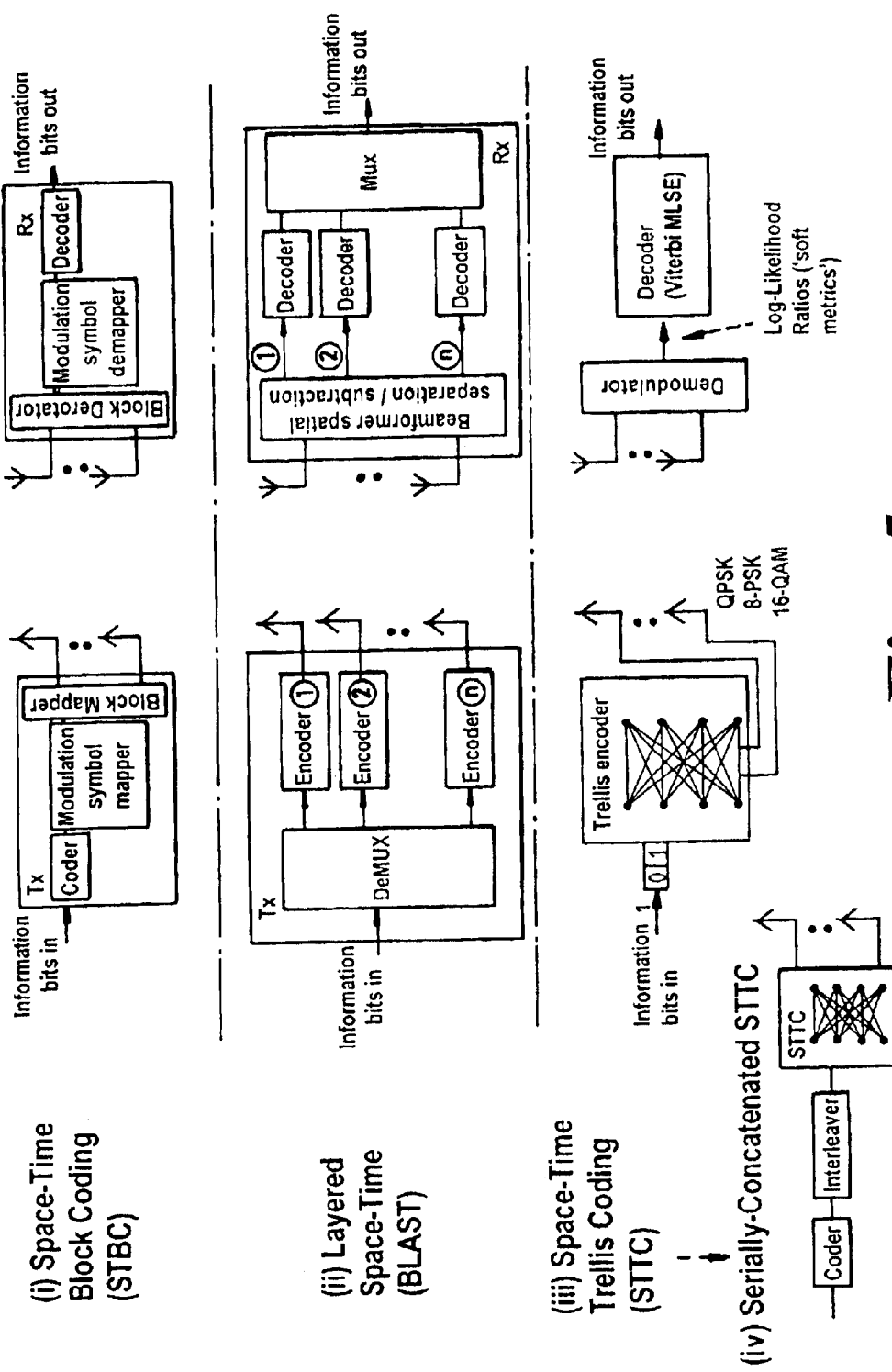
FIG. 5 shows candidate approaches to space-time coding.
Figure 6:
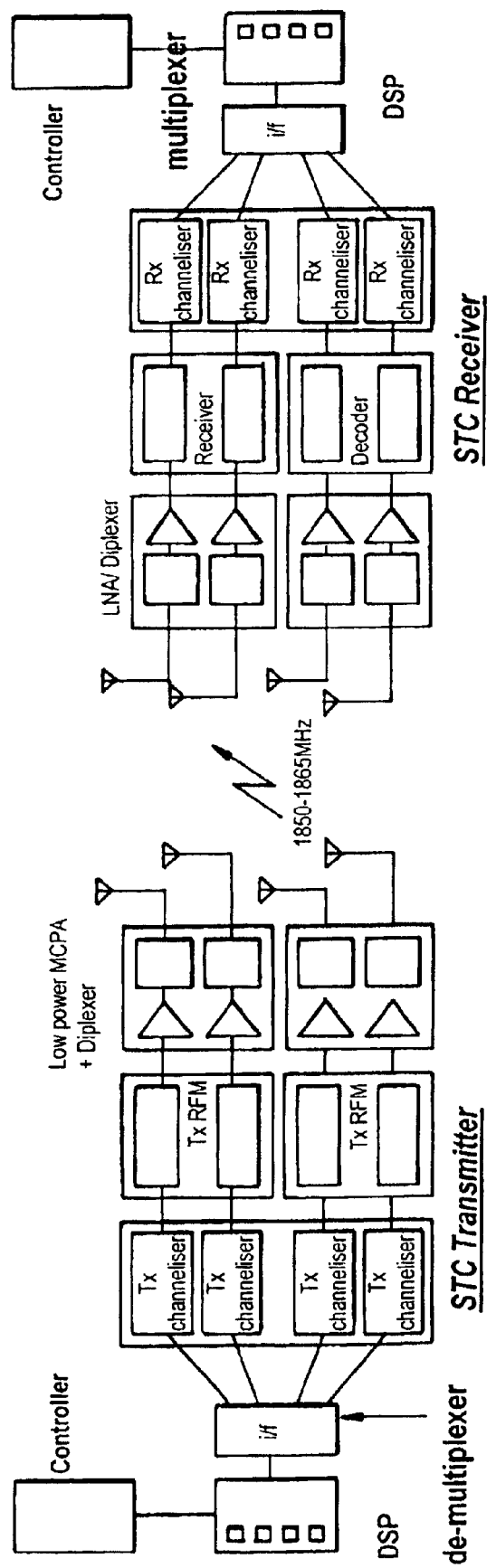
FIG. 6 shows an MC-STTC transmitter and receiver.

The two best-known Orthogonalised Space-time coding schemes are a) Space-Time Transmit Diversity (STTD), a special case of STBC, shown in FIG. 5 which was first described by Alamouti, and b) Orthogonal Transmit Diversity (OTD). The principle of both schemes is to map coded modulation symbols to two transmit antennas. It has been shown that STTD is superior to OTD (typically around 0.5dB better in terms of $E_b/N_o$), since it maps all modulated symbols to both transmit antennas, whereas OTD only maps each modulation symbol to one of the antennas, and relies on the memory within the coder to obtain the diversity advantage. Note that both STTD and OTD have the desirable property that they don't expand the bandwidth of the signal, and thus in a CDMA system they don't use up any more Walsh codes than the baseline. Furthermore, the receiver can process the received signal using linear processing, avoiding the requirement for more complex a posteriori probability (APP) detection of the Space-Time Block Code (STBC), shown in FIG. 5($i$). Using STTD and OTD it is possible to extract diversity without having to sacrifice spectral efficiency, since the codes are 'rate 1'.

A further approach is the Bell Labs' Layered Space-Time Processing (BLAST) approach to STC (Foschini, G. J; 'Layered space-time architecture for wireless communication in a fading environment when using multi-element antennas', Bell Labs Technical Journal, Vol. 1 No. 2, Autumn 1996, pp. 41–59.). The basic concept behind layered STC Is illustrated in FIG. 5($ii$). The information bits are demultiplexed into individual streams, which are then fed into individual encoders. These coders may be binary convolutional coders, or even have no coding at all. The outputs of the coders are modulated and fed to the separate antennas, from which they are transmitted, using the same carrier-frequency/symbol waveform (TDMA) or Walsh code (CDMA). At the receiver, a spatial beamforming/nulling (zero-forcing) process is used at the front end in order to separate the individual coded streams, and feed them to their individual decoders. The outputs of the decoders are multiplexed back to reconstruct the estimate of the original information bit-stream.

There are a number of disadvantages to the above zero forming receivers in that some of the diversity potential of the receiver antenna array is necessarily sacrificed in the beamforming process. In order to overcome this problem, layering the receiver processing. using Multi-User Detection (MUD) techniques such as subtractive cancellation have been proposed. The disadvantage with this layered approach, like all subtractive multi-user detection schemes, is that wrong detection decisions higher up in the chain can adversely affect performance lower down. The receiver described in detail below could potentially be used to improve the performance of a BLAST receiver, for example, by using soft-cancellation Tarokh et al have generalised Alamouti's STTD concept ('Space-Time Block Coding for Wireless Communications: Theory of Generalised Orthogonal Designs' Submitted to IEEE Trans. Inf. Theo.) to larger numbers of transmit antennas, with their so-called 'Theory of Generalised Orthogonal Designs ', which they claim is based on a well-known matrix problem in the mathematics literature, the so-called 'Hurwitz-Radon' problem. The authors claim that for complex modulation constellations there are no generalised orthogonal designs of rate 1 which map all input symbols to all transmit antennas (yet still allowing simple linear processing at the receiver) for $N_T>2$. They do, however, present rate ¾and rate ½designs for $N_T=4$, for example. This technique is known as Orthogonal Space-Time Block Coding (OSTBC).

Higher-order orthogonailsed designs offer improved diversity, but at the price of a reduced spectral efficiency, and have yet to offer any intrinsic coding gain. They thus consume valuable Walsh codes in a CDMA system, or timeslots in a TDMA system. Such designs are therefore not attractive for multiple receiver (i.e. terminal) antennas applications, since system capacity would be predominantly bandwidth-limited rather than interference-limited.

As a way to avoid this spectral efficiency reduction, a hybrid OTD/STTD scheme has recently been proposed, which uses four transmit antennas, but forms a rate 1 block code. However, this doesn't achieve full 4way antenna diversity on every coded symbol. Instead, it achieves 2-way antenna diversity on every coded symbol (like STTD), and further diversity is then achieved (up to our full 4-way) through the coding structure (like OTD).

Space-Time Trellis Coding (STTC) is a generalisation of Trellis-Coded Modulation (TCM). The basic structure of the STTC encoder is illustrated in FIG. 5(*iii*) and the encoder can be considered in the most general sense as a finite-state state-machine. The value of the latest group of information bits is used to determine the tansitions which will occur between present state and next state. The result of this transition is the transmission of what is known as a 'Space-Time Symbol' (STS), which (as noted above) is actually equivalent to the simultaneous transmission of a group of symbols; one from each of the transmit antennas. In principle, it could be arranged for the encoder to transmit a sequence of Space-Time Symbols in response to a single trellis transition (branch). This 'multidimensional' approach would inevitably lead to a reduction in the code's spectral efficiency, but potentially could improve power efficiency. The constituent symbols of the STS could, for example, be chosen from any set, such as QPSK, 8-PSK or 16 QAM. However, in the simulations presented later in this section only the QPSK case is considered.

The operation of the STTC decoder described in mathematical terms above will now be further explained.

The decoder employs a Viterbi algorithm, and thus is necessarily somewhat complex. The task of the STTC decoder is to track the progress of the encoder state machine, based on the observable signal received on (potentially) a multiplicity of receiver antennas. The usual approach (for a non-concatenated STTC) is to employ the Viterbi algorithm in order to form the maximum-likelihood ('hard') estimate of the original information sequence. The Viterbi algorithm requires at its input, for each 'branch' of the decoding (i.e. for each transition from present state to next state), a set of log-likelihood ratios (LLR) for the set of all possible hypotheses of the received STS. This set of LLRs is generated (as discussed above) by the preceding 'demodulator' stage based on squared Eucildean distances (in the $N_L*N_R$-ary complex vector space of the receiver baseband processor $N_L$ is the number of time dispersed paths, assuming a spread-Spectrum waveform) between the hypothesised received symbol (for the trellis branch under consideration) and the actual received signal. As discussed in Massey ('The how and why of channel coding' Proc. International Zurich Seminar on Digital Communications, pp. 67–73, 6–8 March 1984), the 'modulator' must be a memoryless device, and consequently the demodulator is defined as a device to 'extract likelihood information about the possible transmitted signal in every symbol period'. This likelihood information is subsequently passed to the decoder. Note that as the channel changes (due to Doppler), this set of hypotheses for the received STS will also change.

It can be seen that the complexity of such a maximum-likelihood receiver is therefore a function of the number of states in the trellis, the size of the set of possible STS (i.e. the set of possible received-STS hypotheses), the number of branches leaving a state (which also determines the code's spectral efficiency), the number of receiver antennas, $N_R$, the number of time-resolvable paths, $N_L$, and the Doppler rate of the channel (which affects the rate of update of the hypotheses). STTC codes have been analysed and heuristics to design STTCs have been devised (Tarkh V., Seshadri N. and Calderbank A.R.: 'Space-Time Codes for High Data Rate Wireless Communications: Performance Criterion and Code Construction', IEEE Transactions on Information Theory, Vol. 44, March 1998, pp. 744–765) which are believed by some to be optimal (for a given number of states) and optimal STTC codes for $N_T=2$, are employed in comparisons below.

In the embodiments of the invention described below, a class of codes, conveniently termed 'Modified-Convolutional Space-Time Trellis Codes' (MC-STTC) have been devised. The technique comprises the taking of an optimal binary convolutional code of a given constraint length, mapping the outputs to QPSK symbols, and de-multiplexing the result to the different transmit antennas. The MC-STTC technique thus provides for de-multiplexing to take place after the coding and symbol mapping (modulation). The MC-STTC equivalent trellis structure can be readily determined in the form of the conventional STTC, and hence decoded in the same manner. The detailed properties of this MC-STTC class of codes are not assumed to be optimal for all channel types and antenna configurations, but simulation results show a promising performance.

With non-concatenated STTC techniques, coding complexity, and hence performance, can be increased by increasing the number of trellis states. The drawback is that the decoder complexity also scales linearly with the number of states whereas, based on experience with conventional convolutional codes, diminishing returns in terms of power efficiency are expected.

Figure 7:
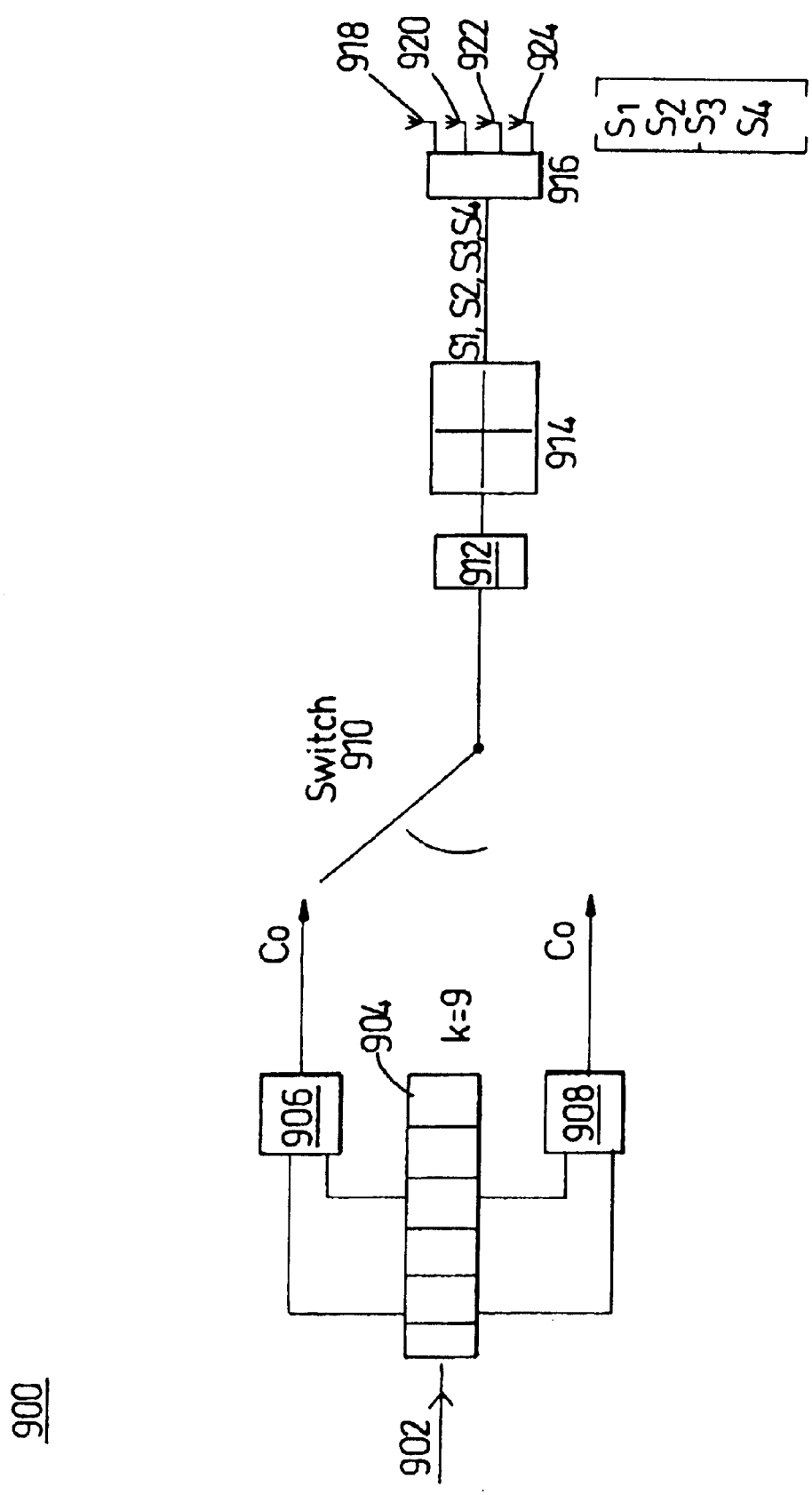
FIG. 7 shows a convolutional encoder in detail.

The binary convolutional encoder 900 is shown in greater detail in FIG. 7. Incoming binary data 902 grouped into units of 4 information bits, is input into a shift register 904 having a constraint length K of 9. The rate is one half with two modulo 2 summers, 906, 908 generating two binary coded symbols for each data bit input to the encoder. The code symbols are output so that the code symbol ($c_0$) encoded with generator function $s_0$, is output first, and the code symbol ($c_1$) encoded with generator function $s_1$, is output last. The state of the convolutional encoder, upon initialization, shall be the all-zero state. The first code symbol output after initialization shall be a code symbol encoded with generator function $s_0$. The generator functions of the code shall be $s_0$ equals 753 (octal) and $s_1$ equals 561 (octal) as per FIG. 16 (source Odenwalder (1970) and Larsen (1973)-). Switch 910 switches the outputs from the summers so that 8 coded bits are mapped by QPSK mapper 914 to four QPSK symbols. Optional unit 912 re-orders bits pseudo-randomly in groups of 8. The QPSK mapper provides 4 QPSK symbols which are de-multiplexed by de-multiplexer 916 to provide one space-time symbol (STS) which is transmitted by all antennas 918–924. The OPSK mapper could provide natural mapping or gray mapping. FIG. 7 shows an MC-STCC-256-4:4 (since K=9, $2^{k-1}2^8$= 256). A receiver suitable to receive the STTC signals can be constructed as is known for the STTC receiver as described with reference to FIG. 5(*iii*), the present invention providing an improved coding scheme and is generally applicable to STTC schemes, the invention is not limited to a particular type of transmitter and receiver group.

Figure 8:
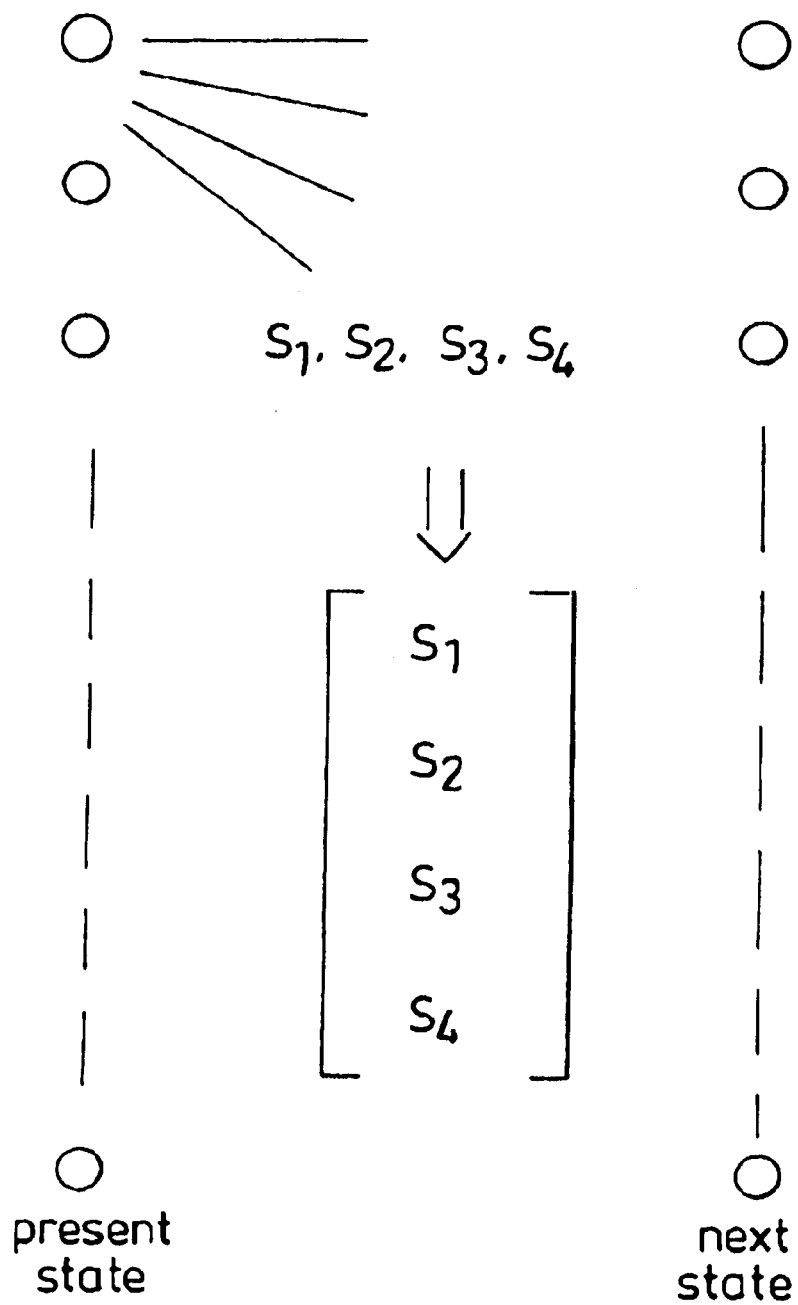
FIG. 8 shows how present state signals are mapped onto next state signals.

FIG. 8 shows a state diagram for this embodiment. There are $2^4$=16 transitions from each present state to each next state and so each transition carries 4 bits of information. Each 'branch' or 'edge' of the trellis, between a 'present state' and 'next state' is associated with transmission (and reception) of a Space-Time Symbol. In this example, a STS consists of four QPSK symbols, simultaneously transmitted from each transmitter antenna.

In an alternative embodiment the convolutional coder could be a quarter rate coder whereby four information bits generate sixteen coded bits, which in turn provide eight QPSK symbols to provide two space-time symbols for each input data block (i.e. for each trellis transition). This is an example of a 'multidimensional' Space-Time Code. In such a way, the MC-STTC technique can be extended to other rate convolutional coders, other modulation symbol alphabets and other numbers of outputs (e.g. antennas) to generate any Space-Time code of desired dimensionality. Indeed we can apply this 'multidimensional' approach to any Space-Time Trellis Code, whereby multiple STSs are transmitted for every trellis branch (every state transition of the encoder finite state machine).

Turning to the receiver, the action of the conventional Viterbi receiver is to find the single survivor (i.e. the most probable) path through the whole trellis, from Start State to End State. This is achieved by finding the path with the lowest state metric (highest probability) which as described above, is found by summing the branch metrics for each branch in the path.

The receiver also uses an array of 4 antenna elements, the signals from which are amplified, down-converted, and digitised using IF and ADC modules. As in the transmitter, a single board of 4 channellisers is used to perform channel filtering, and signals are then routed to a DSP card where the STC receiver processing is performed. The DSP card is controlled by a controller processor, and received data is fed to the controller for routing to the end user, etc. As with the transmitter, common frequency references are used across each of the 4 receive paths, and the sampling instants of the ADCs are also synchronized.

When (STC) is applied to a 3G CDMA system, the individual components of the Space-Time-Symbols (STS) for the Forward-Link (FL) data channels are modulated simultaneously on the multiple transmit antennas. This is carried out using identical outer spreading and identical Walsh codes. It is in this way that the bandwidth efficiency benefits of STC can be achieved through effective 'reuse' of Walsh codes at the different transmit antennas. The receiver must place a rake despreader or 'finger' at the appropriate time offset (corresponding to a particular time delay) in order to simultaneously 'capture' the energy from all of the transmit antennas, However, in order to ensure that this simultaneous despreading takes place, it must be ensured that not only is the same Walsh code used at each transmit antenna, but also the relative delay between the different transmissions is minimised, as they are received at each receiver antenna. Assuming that only a small contribution of this relative delay comes the transmit and receive antenna separation, the major effect will be due to differential delays in the multiple transmitter chains, and in particular in the SAW filters.

In order to carry out demodulation and decoding of the Space-Time Coded signal, the receiver needs to know the complex channel weight between every transmitter-receiver antenna pair, for every delayed time-tap. The 'brute-force' way to achieve this would be for the transmitter to transmit multiple pilots, one from each antenna, where each of these pilots uses up a separate Walsh code. The receiver then tracks each of these pilot transmissions at each receiver antenna. An alternative, but essentially similar technique is for the transmitter to transmit multiple 'Auxiliary Pilots'. The principle of Auxiliary Pilots (AP) is to use the same pilot Walsh code at each transmit antenna (e.g. the 'all 1s' Walsh code, W), but to BAPSK modulate it using an 'outer Walsh code'. In the simplest case, for two transmit antennas, the sequence W,W,W,W,. . . would be transmitted from the 'main' transmit antenna, and W,-W,W,-W . . . from the 'diverse' transmit antenna. Thus, even though the pilots would use the same Walsh codes, W, they would remain orthogonal over multiples of two Walsh symbol periods. In this way, the same channel estimation performance can be maintained, yet using the same Walsh codes at both transmit antennas. The only (minor) drawback of this arrangement is that it limits the maximum rate of channel Doppler that can accurately be tracked at the receiver, since it relies on this orthogonality property over two Walsh symbol periods, rather than just one.

A further alternative is to use the technique described below which permits decoding and channel estimation to be carried out by processing the same transmitted information (i.e. non-training) symbols. This reduces the length of the training sequences which are required and thereby provides increased system capacity.

In order to improve the performance of the space-time decoder, iteration between channel estimation and decoding can be performed. In summary, the technique involves starting with a poor quality channel estimate (due to some small amount of training), decoding the data, and then using this decoded data as a "noisy" training sequence for another round of channel estimation and so on.

This literative procedure improves upon the conventional system in that the decoded data is used to improve the channel estimates, which in turn can be used to improve the quality of the decoded data. This allows a reduction in the amount of training or pilot symbols which are required, since the initial channel estimate does not have to be of the same quality that would be required for the conventional receiver. This in turn improves the spectral efficiency of the system.

Figure 12:
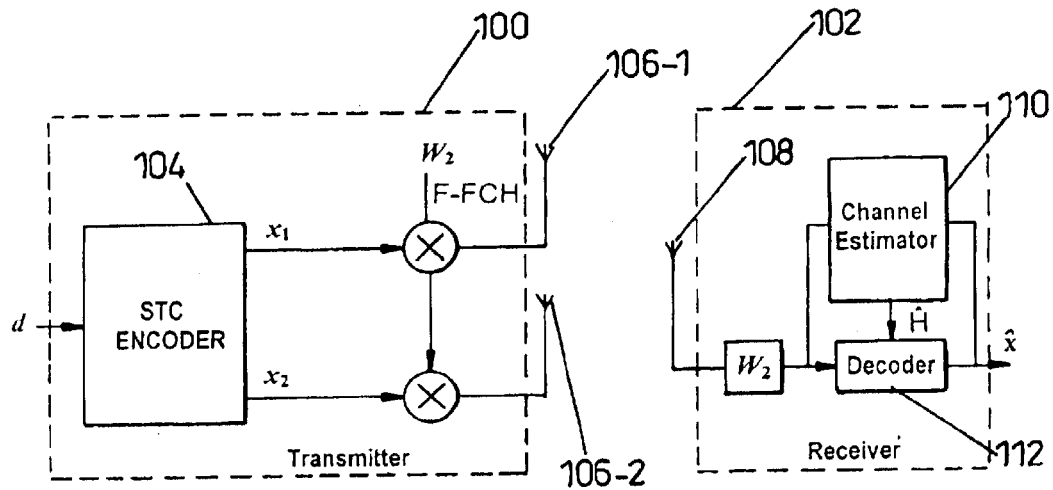
FIG. 12 is a schematic representation of an exemplary STC communications system.

FIG. 12 shows a schematic representation of an exemplary STC communications system. The system has a transmitter 100 and a receiver 102. The transmitter includes an STC encoder 104 which takes data d and produces symbols $x_1$ and $x_2$ which are spread using code $W_2$ and fed to two respective transmit antennas 106-1 and 106-2. (For simplicity, only two transmit antennas and one receive antenna 108 are shown. The technique is equally applicable to other numbers of antennas such as the (4,4) configuration described above). The transmitted symbols are despread in the receiver 102 and then processed (as described in detail below) in a joint channel estimation/decoding process performed in channel estimator 110 and decoder 112.

For illustrative purposes, it is assumed firstly that packets of L symbols are transmitted over a quasi-static flat fading channel i.e. H is constant for each packet duration, but varies from packet to packet, and secondly that M-PSK modulation is used; the symbols transmitted from each antenna being in the modulation set $\aleph = \{e^{2x/m/M}, m=1,2,\ldots,M\}$.

Figure 13A:
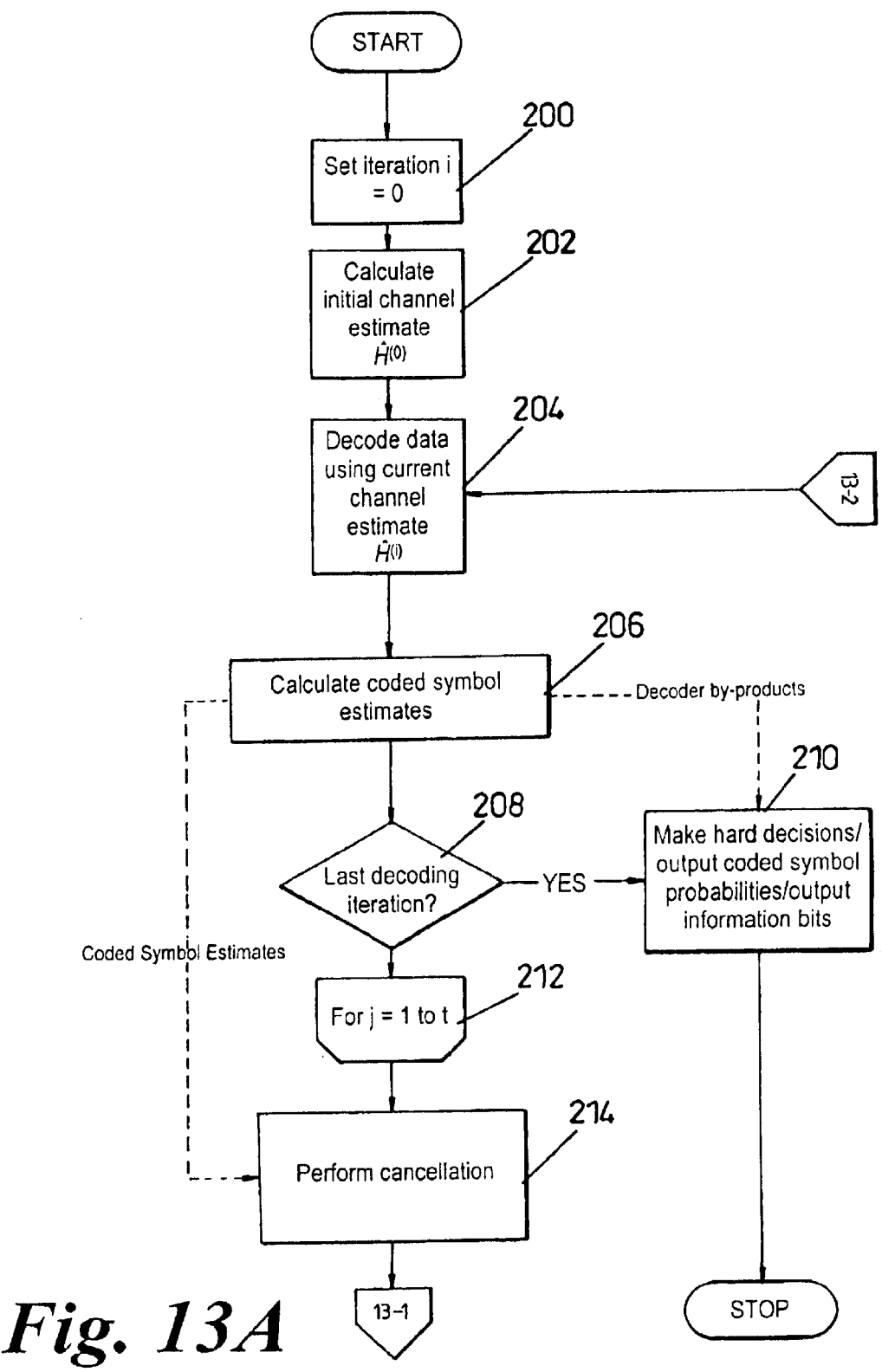
FIGS. 13A and 13B are a flowchart showing the joint channel estimating and decoding technique.
Figure 13B:
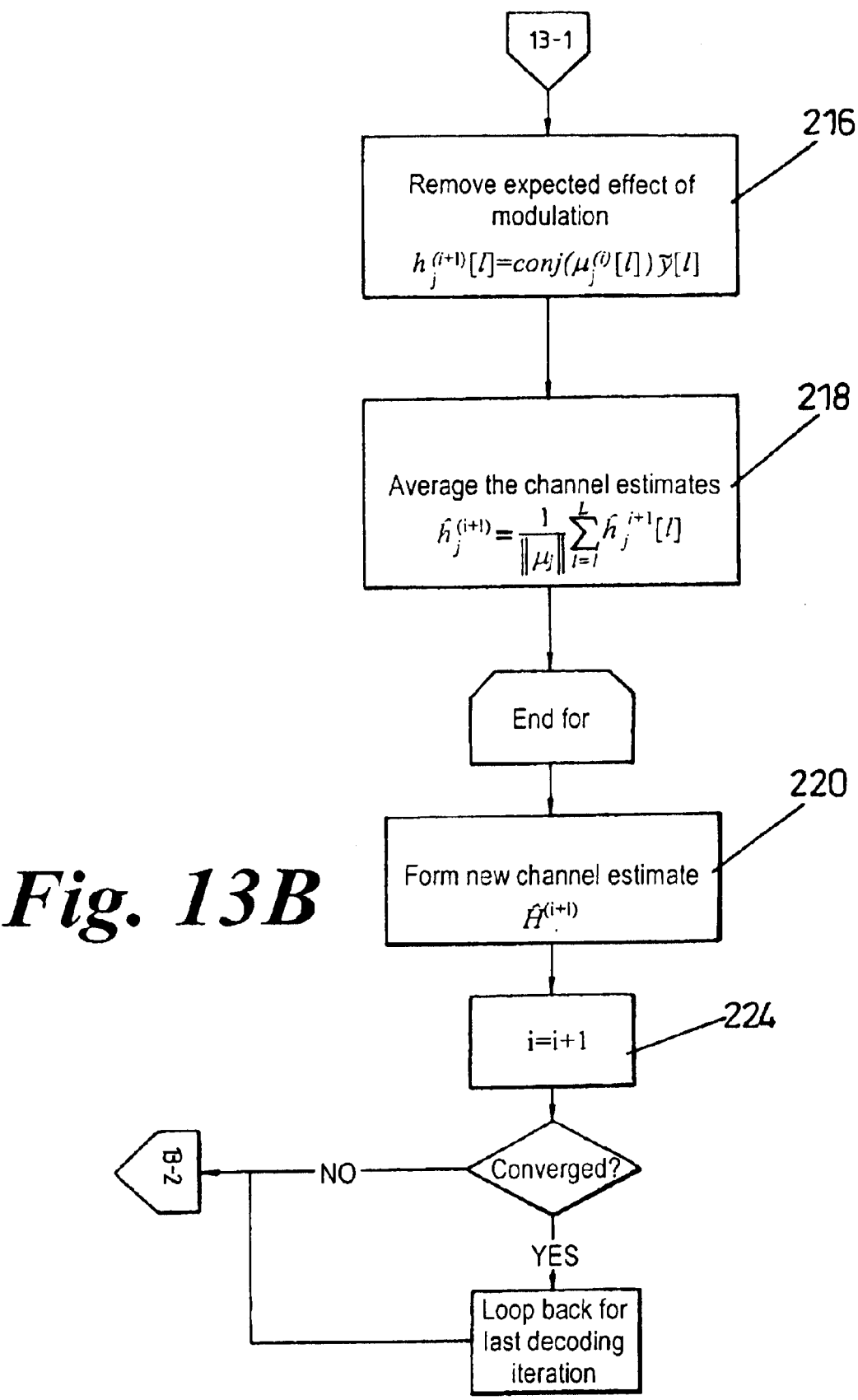

The iterative steps performed by the channel estimator 110 and decoder 112 are illustrated in the flowchart of FIG. 13 and are described below with reference to that figure.

Step 200; Set the iteration number 1=0.

Step 202; Calculate the initial channel estimate $\hat{H}^{(0)}$. —This may be estimated in conventional ways, for example, based on a known training sequence fed to the transmit antennas—at the beginning of each frame, or based on pilot orthogonal Walsh codes. The estimation may be done using any standard channel estimation algorithm, e.g. least squares estimator. —A further alternative is to add known data into the input data stream which causes the encoder to generate known channel symbols. This is similar to the training sequence technique but has advantages in terms of reduced complexity.

It should be noted that this 'bootstrap' channel estimate does not have to be very good, since it only has to be good enough to allow the iteration described below, to get started. Thus very few training/pilot symbols are required; —certainly less than in an equivalently specified, conventional receiver.

Step 204; Decode data preferably using a 'soft' algorithm such as the a-posteriori probability (APP) algorithm and $\hat{H}^{(i)}$ current channel estimate to produce a sequence of coded symbol probabilities $Pr^{(i)}(x_{j[l]})$ for each transmit antenna $j=1, 2, \ldots, t$ and each symbol interval $l=1,2,\ldots,L$. From these probabilities calculate the sequence of coded symbol averages to $$\mu_j^{(i)}[l] = \sum_{x \in N} x Pr^{(i)}(x_j[l] = x)$$

produce symbol estimates (step 206). Optionally, 'harden' the probabilities by using a 'slicing' technique, for example, by setting the symbols with the highest probability to 1 and all other symbols to 0 and using these to perform a 'hard' cancellation in step 214 below. Alternatively, the decoding could be performed using a Viterbi decoder or other decoder which directly produces 'hard' outputs. Step 208; if this is the last decoding step (because the channel estimate result has 'converged' to a substantially invariant estimate in the previous iteration i.e. no further improvement in the estimate is obtained by further iteration), the iteration loop is exited. The decoder may now be arranged to output several different types of information depending largely on the decoder requirements. For example, hard decisions on the coded symbols may now be made (step 210) using the latest channel estimate, which provides the information symbols. However, it will be noted that in step 204, the coded symbol probabilities are calculated during channel estimation and these 'soft' outputs may (once the iteration loop has been completed) be used to provide the inputs to another decoder in a serially-concatenated (SISO) decoder such as that described below (in connection with FIG. 9). A third option is to use probabilities of the information bits (which will usually be generated as a by-product of the APP decoding process of step 204) to make hard decisions directly about the information bits.

Before convergence occurs, the channel is estimated in an iterative loop as follows.

Step 212; For j =1 to t(loop over transmit antennas)

Step 214; Perform the soft cancellation $$\tilde{y}[i] = y[i] - \sum_{k \neq j} \mu_k[i] \hat{h}_k^{(i)}$$

where $$\hat{h}_k^{(i)}$$

is row K of $\hat{H}^{(i)}$ (the gains between antenna k and each of the receive antennas) where soft decoding is performed in step 204, or otherwise perform hard cancellation. This step attempts to remove the effect of transmit antennas other than antenna j. In the soft case, by cancelling the average symbols (a soft cancellation) the effect of uncertain symbols on the estimate is automatically reduced. In the extreme case in which the decoder has no idea what a particular symbol is, the average for that symbol will be zero, and no cancellation will be performed. However, simulations suggest that the reduced complexity of hard decoding does not significantly reduce the channel estimation speed or quality.

Step 216; Remove the expected effect of the modulation on antenna j according to $$h_j^{(i+1)}[l] = conj(\mu_j^{(i)}[l]) \tilde{y}[l]$$

where conj denotes complex conjugate. Note that this produces one channel estimate per symbol. Multiplication by the complex conjugate of the average symbol can be thought of as "squaring out" the modulation. This requires a constant modulus modulation such as PSK to be used, since in that case for any unit power modulation symbol a we have conj(a)a=1.

The algorithm could be modified to deal with other modulation sets, but it would no longer be as simple as multiplying by the conjugate of the average symbol (e.g. division by the average symbol could be used although this would result in noise enhancement).

Step 218; Average the channel estimates $$\hat{h}_j^{(i+1)} = \frac{1}{\|\mu_j\|} \sum_{l=1}^{L} \hat{h}_j^{i+1}[l]$$

where the division by $$\|\mu_j\| = \sum_{l=1}^{L} |\mu_j[l]|$$

scales the channel estimate according to the reliability of the decoder output. If the channel changes during the packet a moving average filter may be used.

Step 220; End For Loop.

Step 222; Form a new channel estimate $\hat{H}^{(i+1)}$ using as row J the $$\hat{h}_j^{(i+1)}$$

just calculated.

Step 224; $i+1$. Repeat steps 204 to 224 until convergence.

In this way, channel estimation is performed using information symbols which are also decoded as part of the estimation process. Thus a very short training sequence (or the other options discussed above in connection with step 202) may be used which is just long enough to produce an adequate initial estimate in step 202. This is because the relatively coarse initial 'training' is refined using what are conventionally considered to be 'non-training' symbols. As discussed above, reduced training sequence lengths results in desirable system capacity increases.

In effect, this technique releases information about channel gains that has always been present in information symbols (since the information symbols have been transmitted over the channels in the same way as training symbols) but which has hitherto been ignored.

Figure 14:
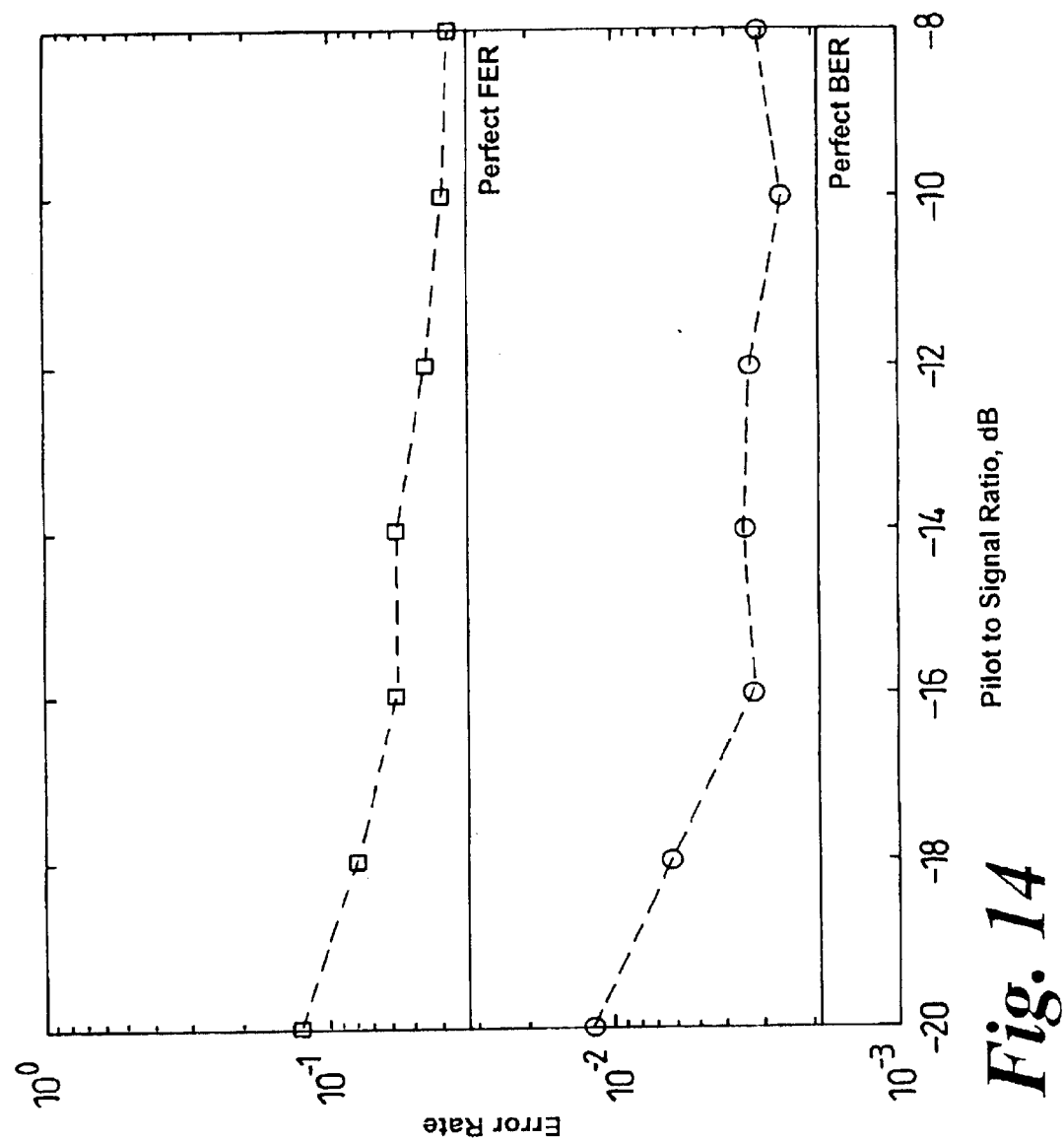
FIG. 14 is a plotted simulation result indicating the relationship between pilot power and decoder performance for the conventional receiver.

Of course, system capacity gained in this way would be of little value if the technique reduced system performance significantly. FIG. 14 shows a simulation result indicating the relationship between pilot power and decoder performance for a conventional receiver. The horizontal axis carries the ratio of the pilot power to the signal power in decibels. The simulation parameters are $t=2$, $r$ $32$ $1$ and $E_b/N_o=14$dB. The four-state code from V. Tarokh, N. Seshadri and A. Calderbank, "Space-time codes for high data rate wireless communication: Performance criterion and Code Construction," IEEE Trans. Inform. Theory 44(2): 744–764 March 1998 is used. From this figure we can see that as the pilot power is reduced, the performance of the conventional receiver degrades. In order to achieve performance close to that with perfect channel knowledge, a pilot to signal power ratio greater than −10 dB is required. From the point of view of training symbols, this means a training overhead of at least 10%, which reduces spectral efficiency.

Figure 15:
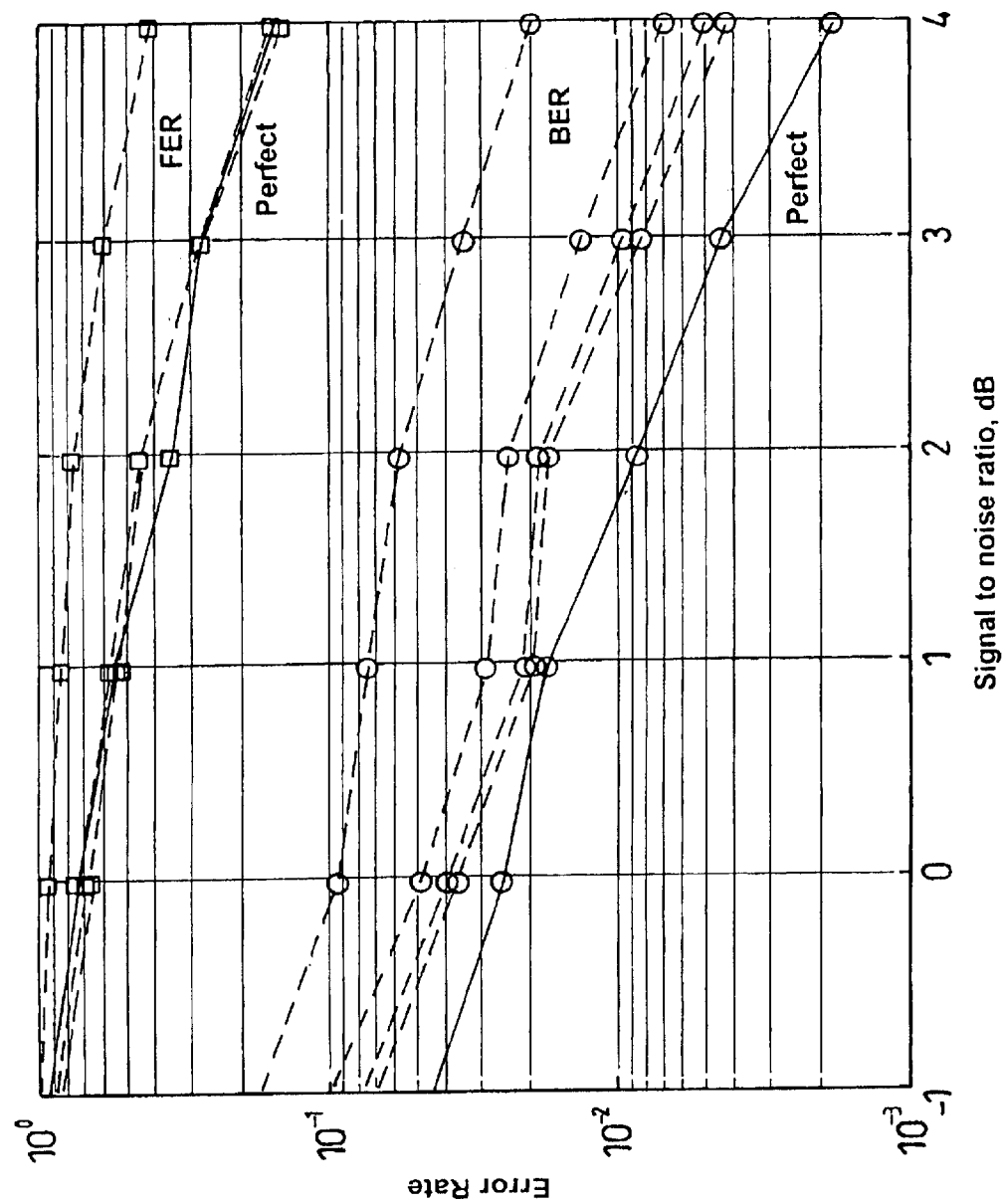
FIG. 15 shows indicative performance results for a decoder in accordance with the invention.

FIG. 15 shows indicative performance results for the proposed system. The system parameters are $t=2$, $r=2$. The same four-state code as that of FIG. 14 is used. Only two training symbols are used and APP decoding and soft-cancellation are implemented. The horizontal axis shows the signal to noise ratio, $E_b/N_o$. The vertical axis shows the measured error rate (frame error rate for the top set of curves and bit error rate for the bottom set). The solid lines show the performance with perfect channel knowledge. The dashed lines show the error rate measured at the output of the iterative receiver for 1,2,3,4 iterations. The FER performance of perfect channel knowledge is achieved after only two iterations.

Thus the proposed receiver reduces greatly the amount of training required compared to the conventional receiver (for packets longer than 20 space-time symbols). The exact saving depends on the fade rate, since this determines how often the training data must be sent Returning to the STC code, an alternative approach to obtaining a code with a large number of states (e.g. >256) is to serially concatenate a pair of low-complexity trellis codes. It is important to interpose the inner and outer coders with an interleaver of large span. For optimal performance a single MLSE with a large number of states is required, in order to decode the whole aggregate concatenated codeword in a single 'pass'. However, a lower-complexity alternative decoding strategy has been seen in many cases to offer close-to-optimum performance, at least for the case of serially-concatenated time-only (i.e. non-STC) codes. The basis of this later technique, based on the 'turbo' principle, is to decode the two constituent ('inner' and 'outer') codes individually using Soft Input Soft Output (SISO) decoders.

These SISO decoders should ideally be based on the APP (A Posteriori Probability) algorithm, which itself is a development of the BCJR MAP algorithm (Bahl L. R., Cocke J., Jelinek F. and Raviv J.: 'Optimal Decoding of Linear Codes for Minimizing Symbol Error Rate', IEEE Transactions on Information Theory, March 1974). The extrinsic soft outputs of each constituent decoder provide intrinsic soft inputs to the next decoder (if the channel estimation technique described above is used, soft outputs of the joint decoder/estimator are used to feed into the second decoder). In this way it is hoped that the two decoders will iterate towards the global overall MAP sequence detection (which should be close to MLSE). The specification of a good overall Serially-Concatenated Space-Time Trellis Coder (SC-STTC) structure, based on sound optimisation criteria, is complex. In FIG. 9 a coding and decoding structure is shown. One feature of the present invention as discussed in connection with EDGE, is that channel dispersion is determined as a 'decoding' problem rather than an 'equalisation' problem, combined with an iterated serially-concatenated SISO decoding scheme.

FIGS. 5($iv$) and 9 show a top level serial concatenated STTC architecture. As described for STC earlier, the transmitter employs Base Transceiver (BTS) modules suitably modified to independently drive a 4-element antenna array. A controller unit supplies data for transmission to a DSP card, upon which the STC coding and modulation for all 4 transmit channels will be performed. Data is then passed to four, for example, 125MHz bandwidth channellisers. and these signals are then up-converted to 2GHz for transmission.

The main candidate STC algorithms have been qualitatively described. The respective performances in quantitative terms, based on simulation results ill now be discussed. The simulations were carried out at the symbol-level, for a simplified system, whereby frames of space-time symbols were transmitted over a quasi-static flat Rayleigh fading MIMO channel. Each frame carried 400 information bits (800 in the case of BLAST). Performance is quantified in terms of required $E_b/N_o$ at each receiver antenna for a mean frame-error-rate (FER) of 10%, where $E_b$ is the energy per information bit. There is no simulation of fast power control, so received $E_b$ is also equal to transmitted $E_b$ (making the normalizing assumption, that each channel coefficient has a mean square value of unity). For simplicity, it is also assumed that there is zero correlation between the various transmit-receive antenna paths, which assumes a certain minimum spacing between antenna elements at both the BTS and mobile. The results of these simulations are shown in FIG. 17.

Figure 10:
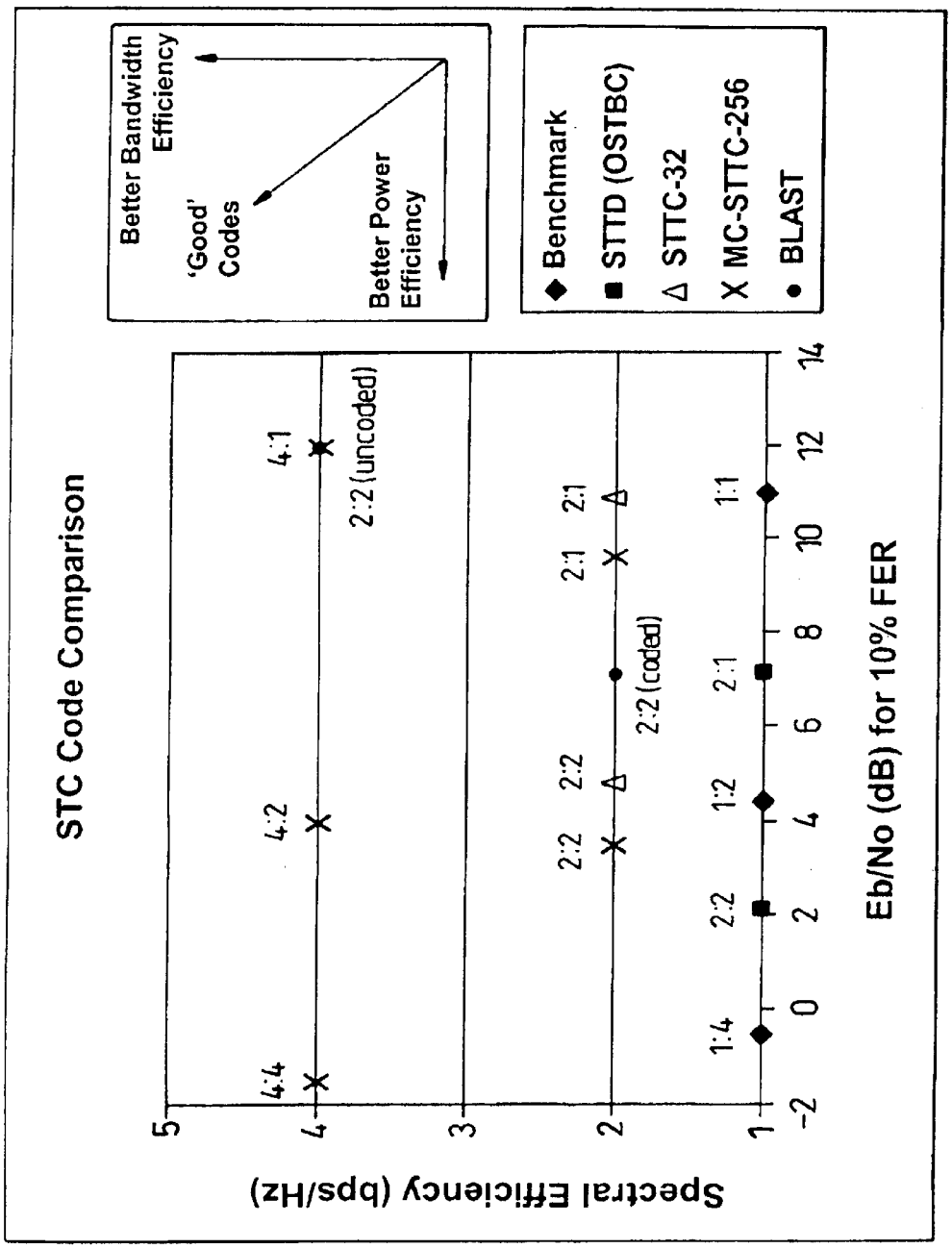
FIG. 10 shows a comparison of spectral efficiency and $E_b/N_o$ for a number of coding/decoding schemes.
Figure 11:
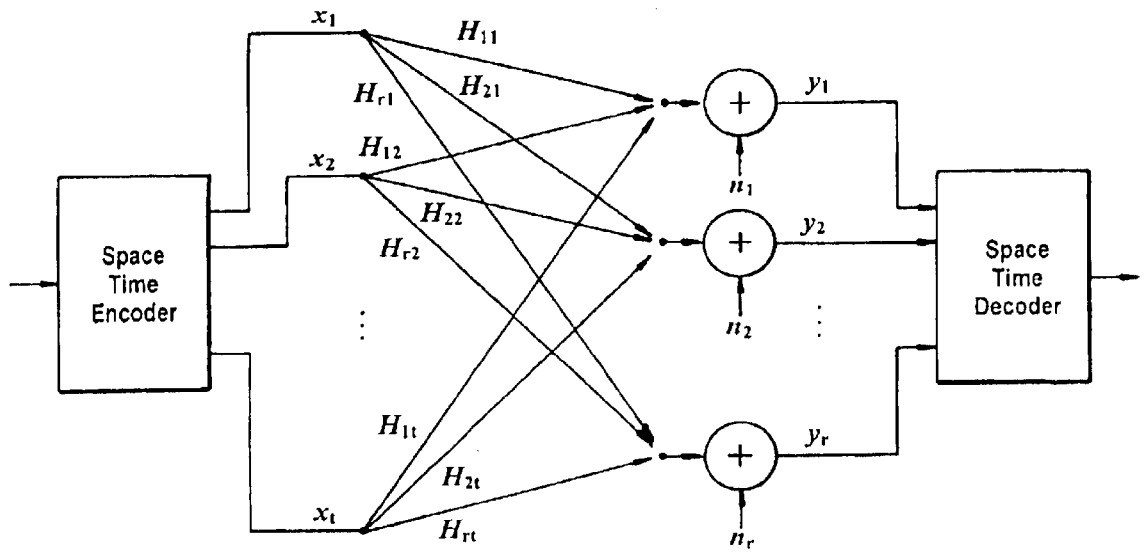
FIG. 11 is a schematic diagram of a typical STC channel model.

The results of FIG. 17 are also plotted in FIG. 10, showing the trade-off of $E_b/N_o$ performance (power efficiency) -against spectral efficiency. The missing 'third dimension' on the figure is that of decoder complexity. After conversion from $E_b/N_o$ to $E_s/N_o$ (which is the corresponding SNR metric) the performance results can also be compared with the theoretical performance curves shown earlier. However, it should b remembered that the underlying assumptions are different in the two cases, since, in the case of the fundamental performance curves, the frames are assumed to approach infinite length, with a vanishingly small error rate, and a Space-Time Code which adapts from frame-to-frame, whilst, for the simulation case, there are finite frames, a fixed code, and an allowed non-zero probability of frame error.

Examining the results of FIG. 17 (and FIG. 10) it can be seen that the benchmark has a poor performance in the 1:1 case, with a required $E_b/N_o$ of 11.0 dB. This is 8.8 dB higher than the static channel performance, and is due to the high fade margin required due to the lack of diversity. This performance can be improved either by increasing the number of receiver antennas (yielding both SNR gain and diversity gain) or by increasing the number of transmit antennas and using STTD, or both. In the latter case, for STTD 2:2, we see a required $E_b/N_o$ of only 2.2 dB.

For the case of two receiver antennas, this 22dB $E_b/N_o$ is the best that can be achieved for the algorithms simulated. However, It is achieved at the expense of a poor spectral efficiency of only 1 bps/Hz. The spectral efficiency can be doubled to 2bps/Hz using Tarokh's STTC-32 code, code, but at the cost of a 2.4dB degradation in mean $E_b/N_o$. If the number of code states is increased to 256 using the MC-STTC-256, such that the number of states is now equal to that in the benchmark case, the 2:2 performance is improved to an Ew of 3.5dB. Thus, compared to the STTD 2:2 case there is a degradation of only 1.3dB, but the spectral efficiency is doubled. For a system which is predominantly bandwidth (Walsh code) limited, rather than power (interference) limited, then this 1.3dB $E_b/N_o$ degradation would be a small price to pay.

For the MC-STTC-256 case, for a receiver with four antennas, the power efficiency is further improved both achieving an $E_b/N_o$, of -1.5dB, with the spectral efficiency achieving 4bps/Hz. Using this code, the difference of an STTD 2:1 scheme to an MC-STTC256 4:4 results in a 8.7dB $E_b/N_o$ reduction for a 4x increase in spectral efficiency. The comparison case of STTD 2:1 could be improved by using a Turbo code instead of a k=9 convolutional code. The 4:4 STC case could also be affected by a similar amount if the MC-STTC-256 code was replaced by a serially-concatenated STTC code (SC-STTC). Thus the relative performance benefit of STC compared to a 'transmit diversity' baseline would remain about the same.

The uncoded BLAST scheme shown in FIG. 17 performs poorly in terms of $E_b/N_o$, but has a high spectral efficiency due to the absence of redundancy, and the use of parallel transmission paths. Separate frames of data (each carrying 400 information bits) are transmitted from each of the two transmit antennas. The stronger of the two frames is detected first, by spatially nulling out (zero forcing) the weaker transmission, before detecting the bits. A 'genie-aided' subtraction process is then applied to perfectly subtract this signal at the receiver, before beamforming to the weaker transmission (avoiding the requirement to null the stronger, since it has already been subtracted). Finally the noisy QPSK data is detected at the output of this beamformer, which is a noisy received signal from the weaker transmit antenna.

Looking at the coded BLAST result in FIG. 17, by application of coding, it can be shown that the performance of BLAST has been improved by 4.9dB, down from 12.0dB to 7.1dB. This has been achieved by applying 'baseline' convolutional coding at the transmitter, along with a transfer of soft metrics from the beamformer pre-processor to the respective decoder. However, this is achieved at the expense of a reduction in spectral efficiency. Non-genie-aided simulation experience to date indicates that in practice the performance of coded BLAST 2:2 is in fact some 2-3dB worse than this, and so the subtraction processing falls rather short of a magic genie, due to the effect of error propagation down the layers. This would suggest that the transmission from the stronger transmit antenna (for any given frame) is actually more vulnerable (and therefore has a higher frame error probability) than the transmission from the weaker, due to the 'noise amplification' in the receiver antenna nulling process.

FIG. 18 shows a comparison of the complexities of the different STC algorithms in terms of MFLOPS (or MIPS if a fixed-point device is used). These processing loads assume a 153.6kbps data rate over the link. A 1-tap channel is assumed, and so the complexity analysis is pertinent to both TDMA and CDMA implementations in this flat channel. A number of simplifying assumptions have been made.

The processing tasks are partitioned into 'demodulator'- and 'Viterbi MLSE'. The demodulator generates the Log-Likelihood Ratios (LLR), also known as 'soft metrics', for the Viterbi decoder. The Viterbi algorithm then performs a maximum-likelihood trellis search based on these LLRs in order to find the highest probability path through the trellis (the so-called 'survivor path'), and hence the most likely information sequence.

Examining the figures in FIG. 18, it is interesting to note that for the benchmark cases only a small percentage of the processing load is taken up by the demodulator and Maximal Ratio Combining (MRC), and the vast majority is in the Viterbi decoding (198.4 MFLOPS). Since the STTD 'derotation' pre-processing is similar in principle to MRC, this also doesn't add much to the overall processing. For all of these cases the Viterbi processing load is the same.

For STTC32 the Viterbi processing load is much lighter than for the benchmark case due to the reduced number of states in the trellis. However, the amount of demodulator processing is increased due to the larger number of hypotheses regarding possible transmitted space time symbols. This is a natural consequence of the higher spectral efficiency of our code.

The Viterbi processing load for the MC STTC-256 code is much greater than for STTC32, in direct proportion to the increase in the number of states. As the number of transmit antennas is increased to 4 there is a significant increase in the demodulator processing load, and the demodulator load becomes of a similar order to the Viterbi processing load. For 8 transmit antennas there is an extremely large processing load of around 71 GFLOPS, a figure which would almost certainly rule out the use of such a code with so many transmit antennas for the foreseeable future. The reason for this increased demodulator processing is the huge increase in the number of possible transmitted STS, and hence the large number of hypotheses of possible received STS.

For coded BLAST the Viterbi processing load doesn't change with the number of transmit and receive antennas since the fundamental information rate remains the same. The demodulator processing load, which is shown broken down into 'weight estimation', 'beamforming' and 'subtraction' processing, is in all cases significantly less than the Viterbi MLSE processing, even for the case of 8 transmit antennas. This indicates that for a system where it is wished to employ such a large number of antennas at each end of the link then, for a given spectral efficiency, coded BLAST is far preferable to STTC in terms of complexity, albeit that it will suffer a performance loss, for the type of receiver processing described herein.

An STC scheme which is not analyzed in FIG. 18 is SC-STTC. However, experience with binary concatenated codes, such as Turbo codes, would indicate that the decoder complexity would certainly be well within an order of magnitude of the 'equivalent' non-Turbo (e.g. convolutional) code. The demodulator complexity (i.e. generation of soft metrics) for SC-STTC should therefore be of the same order as for the equivalent STTC.

The OSTBC techniques offer power efficiency benefits through diversity, although not through coding gain. Thus, there will be an application in situations where power efficiency is at a premium, and inherent diversity is low, such as those cases where there is a flat fading channel and only a single terminal antenna. Conversely, due to their low spectral efficiency, they are not of interest in applications where there is already significant diversity and SNR gain through array antennas at the terminal.

Of the Space-Time Coding approaches actually simulated, the STTC techniques appear to offer the best trade-off of performance versus complexity for the applications of interest. The performance they offer goes some way to fulfilling the expectations raised by the fundamental capacity analyses earlier, since there is an improvement in $E_b/N_o$ of around 8.7dB compared to an STTD 2:1 arrangement Optimal STTC codes are known for the 2:2 case, but not for 4:4. However, a simply-derived STTC code based on the ½-rate convolution encoder, namely the MC-STTC-256, has 8 performance which will provide a dose to optimum performance for this class of coding at this complexity (probably within 1 dB).

The layered (BLAST) codes, as implemented in the simulator, offer poor performance. This is largely due to the loss of diversity, which arises due to the antenna nulling process, and error-propagation effects due to imperfect subtraction. It is believed that coded BLAST schemes will always prove to be inferior to STTC due to this diversity loss for the non-optimal decoders described here, and because the decoders are inefficient, since they do not 'share' information in order to carry out joint estimation. However, for those applications which might be operating with large numbers of antennas (8 or more) at each end of the link. BLAST becomes more attractive than STTC, due to the significantly lower demodulation and decoding processing requirement (albeit with poorer performance). Thus STTC (or its serially-concatenated variants) is most appropriate for small numbers of transmit antennas (up to 4, say), but when there are larger number numbers of transmit antennas then it could be that BLAST is more appropriate.

Based on experience with conventional time-only convolutional codes, it is to be expected that the performance of even low-complexity serially-concatenated codes (SC-STTC) would outperform the non-concatenated STTC codes of even quite high complexity. The benefits of a non-concatenated structure relative to a concatenated structure, for a given decoder complexity, would, perhaps, be something of the order of 1–2dB.

With respect to the implementation aspects of the invention, the following notes are relevant:

SAW filters: There is a requirement within STC for very tight control of delay through the multiple transmit chains. The main source of any such delay is believed to lie within the transmit SAW filters, since they are required to have steep roll-off skirts within their frequency response. SAW filters for these applications typically have a mean group delay (averaged over the pass-band) of the order of microseconds, for example. This mean group delay is much larger than the typical chip period for wideband CDMA applications. SAW filters also exhibit a considerable ripple in their frequency and phase (and hence group delay) response across their pass-band due to triple-transit effects. However, it is believed that the wide-band nature of the CDMA waveform will mean that these delays are averaged out in the time domain, and that it is the mean delay which is of most concern, in particular how this can be matched across devices from the same, and possibly different, manufactured batches. SAW filter delay problems can be minimized by an appropriate choice of SAW filters which are well matched in terms of mean delay. An alternative could be to carry out some delay compensation in the transmitter DSP.

Local Oscillator (LO) lock: In order to maintain orthogonality between the different Walsh codes over a symbol period, and ensure that a single despreader at the receiver can be used to receive multiple transmissions from the different transmit antennas, it is important that the carrier frequencies of the different transmissions are closely controlled. This effectively means that the phase noise must be controlled, and that the LO offset between different transmit chains be much less than the reciprocal of the symbol period. Preferably different transmit chains have LOs locked to a common reference.

Amplitude Imbalance: The Space-Time codes are designed assuming equal mean power from each of the transmit antennas. If this cannot be maintained exactly, then it will probably not be critical, as long as any gain imbalances suffered by an STC encoded traffic channel account when calculating the soft metrics, and will in fact not be able to distinguish transmit gain imbalances from propagation gain imbalances. However, there will b a reduction in the fundamental capacity of the MIMO transmitter receiver link.

Pilot (and Auxiliary Pilot) de-spreading: There is a requirement for the receiver to track (i.e. de-spread) all of the pilot transmissions from all of the transmit antennas, at each of its receive antennas, for $N_L$ paths. If the system has $N_T$ transmit antennas, $N_R$ receiver antennas, and $N_L$ time-dispersed taps in the channel, then it can be seen that the DSP processing load to carry out this pilot de-spreading scales in proportion to $N_T*N_R*N_L$, if a different pilot Walsh code is employed on each transmit antenna. However, considerable DSP complexity savings are possible if the Auxiliary Pilot (AP) principle is used, since the same fundamental Walsh sequence is then used at each transmit antenna.

Traffic channel de-spreading: As mentioned above, in order to carry out de-spreading of a traffic channel, the receiver must place a rake 'finger' at the appropriate time offset corresponding to a particular time delay) in order to simultaneously 'capture' the energy from all of the transmit antennas. Again, this effectively involves a 'correlation' or 'matched filtering' process over the period of a Walsh code ('Walsh symbol'), which, depending on the symboling rate chosen, may be somewhere typically in the range 64≧256 chips.

Searcher-finger workload: Whilst carrying-out demodulation, the terminal receiver must also be able to search for new time-dispersed multipaths. Applying a brute-force approach, this would involve processing which scales by $N_T*N_R$.

DLL jitter: DLL techniques will be used at the receiver to track the timing of the various multipaths. In order to be able to track time-delayed multipaths with time delays changing at a rate commensurate with the channel Doppler, the loop-bandwidth of the DLL will need to b reasonably wide.

What is claimed is:

1. Space-time coding apparatus comprising:
   (a) a data input,
   (b) a plurality of signal outputs couplable to a respective plurality of transmit antennas,
   (c) a trellis encoder implemented using a convolutional encoder and arranged to receive data from the data input and to produce encoded data in the form of code symbols,
   (d) a modulator arranged to map the encoded data to predetermined modulation symbols, and
   (e) a de-multiplexer arranged to de-multiplex the modulation symbols to the signal outputs to provide a space-time encoded information symbol which is transmitted by all of the plurality of transmit antennas.

2. Apparatus according to claim 1 wherein the convolutional encoder is arranged to generate two code symbols for each data bit input to the trellis encoder, and wherein the two code symbols are alternately switched to an output of the trellis encoder.

3. Apparatus according to claim 1, wherein the data input receives binary data which is grouped into four-bit data blocks, each block representing a single trellis transition, and the convolutional encoder is arranged to produce eight 1-bit code symbols for each four-bit data block, the modulator being arranged to map the eight code symbols to four QPSK symbols to form a single space-time symbol.

4. Apparatus according to claim 1 wherein the rate of the convolutional encoder and a modulation alphabet of the modulator is such that the number of modulation symbols produced for each trellis transition is greater than the number of signal outputs so that more than one space-time symbol is produced for each trellis transition, whereby the apparatus is arranged to produce multidimensional space-time codes.

5. Apparatus according to claim 1, wherein the data input receives binary data which is grouped into four-bit data blocks, each block representing a single trellis transition, and the convolutional encoder is arranged to produce sixteen 1-bit code symbols for each four-bit data block, the modulator being arranged to map the sixteen code symbols to eight QPSK symbols to form two space-time symbols.

6. A method of space-time encoding comprising:
   (a) receiving a stream of data at an input,
   (b) trellis encoding the data stream using a convolutional encoder operable to sequentially group data to provide coded bits,
   (c) outputting the encoded data to a modulator,
   (d) operating the modulator to map the encoded signals to QPSK symbols to provide modulated signal, and (e) operating a de-multiplexer to switch the modulated signals to a set of signal outputs to provide a series of space-time encoded information symbols which are transmitted by all of the plurality of transmit antennas.

7. A method according to claim 6 wherein the input receives binary data and the convolutional encoder groups sequentially input data into quaternary groups, which are processed by the encoder to provide eight-bit data groups which are subsequently converted to QPSK symbols.

8. A method according to claim 6 wherein the trellis encoder comprises a convolutional encoder having a shift register with two parts operable to generate two code signals for each data bit input to the trellis encoder, wherein the code signals are encoded by a generator function, wherein the two coded signals are switched to an output of the encoder.

9. A method of space-time encoding a data stream comprising the steps of:
   (a) trellis encoding a data stream using an optimal binary convolutional code of predetermined constraint length,
   (b) modulating the encoded data by mapping the encoded data stream to modulation symbols selected from a predetermined modulation alphabet, and
   (c) de-multiplexing the modulation symbols to a plurality of transmit antennas to provide a series of space-time encoded information symbols which are transmitted by all of the plurality of transmit antennas.

10. A method of estimating complex channel gain in a space-time communications system comprising the steps of:
    (a) generating an initial estimate of channel gain,
    (b) receiving space-time encoded information symbols over the channels from a plurality of transmit antennas, each of said transmit antennas transmitting the same series of space-time encoded information symbols,
    (c) decoding the information symbols using the initial channel estimate to produce a sequence of symbol estimates,
    (d) refining the channel estimate for each channel, by processing the received symbols to remove an expected effect of the transmissions carried by all other channels by performing cancellation using relevant parts of the sequence of symbol estimates, and to remove an expected effect of modulation on each symbol, and by averaging the channel estimates over all symbols for each respective channel to produce a refined estimate for each channel,
    (e) decoding the information symbols again using the refined channel estimate, to produce a refined sequence of coded symbol estimates, and
    (f) repeating steps (d), (e) and (f) until convergence.

11. A method according to claim 10, wherein the decoding step includes performing hard decoding to produce hard symbol estimates.

12. A method according to claim 10, wherein the decoding step includes performing soft decoding by producing a sequence of coded symbol probabilities which are then used to calculate symbol estimates in the form of a sequence of coded symbol averages.

13. A method according to claim 12, wherein after convergence, the coded symbol probabilities calculated in the last decoding step of the iteration loop are output for feeding to the input of the next decoder in a serially-concatenated decoder arrangement.

14. A method according to claim 10, wherein after convergence, hard decisions on the information symbols are made using the final channel estimate.

15. A method according to claim 10, wherein after convergence, the information bits are decoded using the final channel estimate.

16. A method according to claim 10, wherein the initial estimate is generated based on a relatively short, transmitted pilot or training sequence.

17. A method according to claim 10, wherein the information symbols are modulated using a constant modulus modulation and wherein the expected effect of the modulation is removed by multiplying a symbol with a complex conjugate of the average symbol for that channel.

18. A method according to claim 17, wherein the symbols are PSK modulated.

19. Channel estimation apparatus for a space-time communications system comprising:
    (a) an initial estimator operable to generate an initial estimate of channel gain, (b) a receiver operable to receive space-time encoded information symbols from a plurality of transmit antennas, each of said transmit antennas transmitting the same series of space-time encoded information symbols, (c) a decoder operable to produce a sequence of coded symbol estimates using a channel estimate, and (d) estimate refining means operable to refine the channel estimate for each channel, by processing the received symbols to remove the expected effect of the transmissions carried by all the other channels by performing cancellation using the relevant parts of the sequence of symbol estimates, and to remove the expected effect of modulation on each symbol, and by averaging the channel estimates over all symbols for each respective channel to produce a refined estimate for each channel, the apparatus being arranged to iteratively repeat the refining of the channel estimation and the production of symbol estimate functions until convergence of the channel estimates occurs.

20. Apparatus according to claim 19, wherein the decoder is operable to perform hard decoding to produce hard symbol estimates.

21. Apparatus according to claim 19, wherein the decoder is operable to perform soft decoding by producing a sequence of coded symbol probabilities which are then used to calculate symbol estimates in the form of a sequence of coded symbol averages.

22. Apparatus according to claim 21, wherein the decoder is operable to output the coded symbol probabilities for feeding to the input of the next decoder in a serially-concatenated decoder arrangement.

23. Apparatus according to claim 19, wherein the decoder is arranged to produce hard decisions on the information symbols using the final channel estimate.

24. Apparatus according to claim 19, wherein after convergence, the decoder is operable to decode the information bits using the final channel estimate.

25. A computer program which, when executing on suitably configured hardware, causes the hardware to perform the steps of:

(a) generating an initial estimate of channel gain, (b) receiving space-time encoded information symbols over the channels from a plurality of transmit antennas, each of said transmit antennas transmitting the same series of space-time encoded information symbols, (c) decoding the information symbols using the initial channel estimate to produce a sequence of symbol estimates, (d) refining the channel estimate for each channel, by processing the received symbols to remove the expected effect of the transmissions carried by all the other channels by performing cancellation using the relevant parts of the sequence of symbol estimates, and to remove the expected effect of modulation on each symbol, and by averaging the channel estimates over all symbols for each respective channel to produce a refined estimate for each channel, (e) decoding the information symbols again using the refined channel estimate, to produce a refined sequence of coded symbol estimates, and (f) repeating steps (d), (e) and (f) until convergence.

26. A communications system arranged to use space-time coding, and comprising transmitter apparatus and receiver apparatus, the transmitter apparatus further comprising an input, a trellis encoder, a de-multiplexer, and a plurality of signal outputs and a plurality of transmit antennas wherein the input is operable to receive a stream of data, the trellis encoder is operable to encode the data and is operable to output encoded data, and to map the encoded data to the de-multiplexer, the de-multiplexer is operable to switch signals to the set of signal outputs to provide a space-time encoded information symbol which is transmitted by all of the plurality of transmit antennas, and wherein the trellis encoder comprises a convolutional encoder operable to sequentially group data to provide coded bits which encoded data is mapped to provided modulated symbols.

27. A system according to claim 26, wherein the receiver apparatus includes:

(a) an initial estimator operable to generate an initial estimate of channel gain, (b) a receiver operable to receive space-time encoded information symbols, (c) a decoder operable to produce a sequence of coded symbol estimates using a channel estimate, and (d) estimate refining means opeable to refine the channel estimate for each channel, by processing the received symbols to remove the expected effect of the transmissions carried by all the other channels by performing cancellation using the relevant parts of the sequence of symbol estimates, and to remove the expected effect of modulation on each symbol, and by averaging the channel estimates over all symbols for each respective channel to produce a refined estimate for each channel, the apparatus being arranged to iteratively repeat the refining of the channel estimation and the production of symbol estimate functions until convergence of the channel estimates occurs.

28. A communications system arranged to use space-time coding, and comprising transmitter apparatus and receiver apparatus, wherein the receiver apparatus includes:

an initial estimator operable to generate an initial estimate of channel gain, (b) a receiver operable to receive space-time encoded information symbols from a plurality of transmit antennas, each of said transmit antennas transmitting the same series of space-time encoded information symbols, (c) a decoder operable to produce a sequence of coded symbol estimates using a channel estimate, and (d) estimate refining means operable to refine the channel estimate for each channel, by processing the received symbols to remove the expected effect of the transmissions carried by all the other channels by performing cancellation using the relevant parts of the sequence of symbol estimates, and to remove the expected effect of modulation on each symbol, and by averaging the channel estimates over all symbols for each respective channel to produce a refined estimate for each channel, the apparatus being arranged to iteratively repeat the refining of the channel estimation and the production of symbol estimate functions until convergence of the channel estimates occurs.

* * * * *